United States Patent
Takeda et al.

(10) Patent No.: US 11,690,081 B2
(45) Date of Patent: Jun. 27, 2023

(54) BANDWIDTH PART (BWP) FOR UNICAST/MULTICAST AND RESOURCE ALLOCATION FOR MULTICAST

(71) Applicant: QUALCOMM Incorporated, San Diego, CA (US)

(72) Inventors: Kazuki Takeda, Tokyo (JP); Le Liu, Fremont, CA (US); Prasad Reddy Kadiri, San Diego, CA (US); Ayan Sengupta, San Diego, CA (US); Alberto Rico Alvarino, San Diego, CA (US); Xiaoxia Zhang, San Diego, CA (US); Tao Luo, San Diego, CA (US); Mostafa Khoshnevisan, San Diego, CA (US); Jing Sun, San Diego, CA (US); Xipeng Zhu, San Diego, CA (US); Wooseok Nam, San Diego, CA (US); Wanshi Chen, San Diego, CA (US); Amer Catovic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 17/066,996

(22) Filed: Oct. 9, 2020

(65) Prior Publication Data
US 2021/0127359 A1 Apr. 29, 2021

Related U.S. Application Data

(60) Provisional application No. 62/927,031, filed on Oct. 28, 2019.

(51) Int. Cl.
*H04W 72/00* (2009.01)
*H04L 5/00* (2006.01)
(Continued)

(52) U.S. Cl.
CPC ........... *H04W 72/30* (2023.01); *H04L 5/0092* (2013.01); *H04L 5/0094* (2013.01);
(Continued)

(58) Field of Classification Search
CPC ............. H04W 72/005; H04W 72/042; H04W 72/0453; H04W 72/0493; H04W 76/27;
(Continued)

(56) References Cited

U.S. PATENT DOCUMENTS

2018/0367386 A1* 12/2018 Liao ..................... H04L 5/0092
2019/0165915 A1* 5/2019 John Wilson ......... H04W 48/10

OTHER PUBLICATIONS

International Search Report and Written Opinion—PCT/US2020/055308—ISA/EPO—dated Jan. 21, 2021. 13 pages.

\* cited by examiner

*Primary Examiner* — Shailendra Kumar
(74) *Attorney, Agent, or Firm* — The Marbury Law Group

(57) ABSTRACT

Various aspects provide a method for radio resource allocation to support multicast services from a 5G-NR base station. In some aspects, the method may be performed by a processor of the base station. Various aspects include determining a multicast bandwidth part (BWP) within a carrier bandwidth, sending an indication of the multicast BWP to one or more user equipment (UE) computing devices in communication with the base station, and scheduling transmission of multicast data in the multicast BWP.

24 Claims, 18 Drawing Sheets

(51) Int. Cl.
  *H04L 27/26* (2006.01)
  *H04W 72/04* (2009.01)
  *H04W 76/27* (2018.01)
  *H04W 72/30* (2023.01)
  *H04W 72/0453* (2023.01)
  *H04W 72/23* (2023.01)
  *H04W 72/53* (2023.01)

(52) U.S. Cl.
  CPC ..... *H04L 27/2607* (2013.01); *H04W 72/0453* (2013.01); *H04W 72/23* (2023.01); *H04W 72/53* (2023.01); *H04W 76/27* (2018.02)

(58) Field of Classification Search
  CPC .... H04W 76/40; H04L 5/0092; H04L 5/0094; H04L 27/2607; H04L 27/26025; H04L 5/0007; H04L 5/001; H04L 5/0096; H04L 5/0053
  See application file for complete search history.

BANDWIDTH PART (BWP) FOR UNICAST/MULTICAST AND RESOURCE ALLOCATION FOR MULTICAST

RELATED APPLICATIONS

This application claims the benefit of priority to U.S. Provisional Application No. 62/927,031, entitled "Bandwidth Part (BWP) For Unicast/Multicast and Resource Allocation For Multicast" filed Oct. 28, 2019, the entire contents of which are hereby incorporated herein by reference for all purposes.

BACKGROUND

Long Term Evolution (LTE), 5G new radio (NR), and other recently developed communication technologies allow wireless devices to communicate information at data rates (e.g., in terms of Gigabits per second, etc.) that are orders of magnitude greater than what was available just a few years ago.

Today's communication networks are also more secure, resilient to multipath fading, allow for lower network traffic latencies, provide better communication efficiencies (e.g., in terms of bits per second per unit of bandwidth used, etc.). These and other recent improvements have facilitated the emergence of the Internet of Things (IOT), large scale Machine to Machine (M2M) communication systems, autonomous vehicles, and other technologies that rely on consistent and secure communications.

SUMMARY

Various aspects include methods for radio resource allocation to support multicast services from a fifth generation (5G)-new radio (NR) (5G-NR) network.

Various aspects may provide a method for radio resource allocation to support multicast services from a 5G-NR base station. In some aspects, the method may be performed by a processor of the base station. In various aspects, the method may include determining a multicast bandwidth part (BWP) within a carrier bandwidth, sending an indication of the multicast BWP to one or more user equipment (UE) computing devices in communication with the base station, and scheduling transmission of multicast data in the multicast BWP.

In some aspects, the multicast BWP may be a UE-common BWP configured to be used by at least a portion of the one or more UE computing devices in communication with the base station. In some aspects, the indication of the UE-common BWP may indicate resource allocation related parameters such that a receiving UE considers a lowest resource block (RB) index of the UE-common BWP as an initial physical resource block (PRB) of the UE-common BWP. In some aspects, the method may further include, for each of the one or more UE computing devices, determining whether the UE-common BWP has a same subcarrier spacing (SCS) and cyclic prefix (CP) length as a UE-specific BWP and the UE-common BWP is fully contained within the UE specific BWP, and sending an indication of a search space set for multicast to the respective UE computing device in response to determining that the UE-common BWP has a SCS and CP length as the UE-specific BWP and the UE-common BWP is fully contained within the UE specific BWP. In some aspects the search space set for multicast may be a search space set for multicast or unicast.

In some aspects, the method may further include, for each of the one or more UE computing devices, determining a time switching pattern for the respective UE computing device in response to determining that the UE-common BWP has a different SCS or CP length as the UE-specific BWP or the UE-common BWP is not fully contained within the UE specific BWP, and sending an indication of the time switching pattern for the respective UE computing device to the respective UE computing device. In some aspects, sending the indication of the time switching pattern may include sending the indication of the time switching pattern in a radio resource control (RRC) message. In some aspects, sending the indication of the time switching pattern may include sending the indication of the time switching pattern in a down link control information (DCI). In some aspects, a DCI in the UE-specific BWP indicating BWP switching to the UE-common BWP indicates BWP switching and schedules multicast data in the UE-common BWP, and a DCI in the UE-common BWP indicating BWP switching to the UE-common BWP indicates BWP switching and does not schedule data in the UE-specific BWP.

In some aspects, the multicast BWP may be a virtual BWP. In some aspects, the virtual BWP may be fully contained within a UE-specific BWP with a same subcarrier spacing (SCS) and cyclic prefix (CP) length for each of the one or more UE computing devices. In some aspects, each respective virtual BWP may be identified by a starting resource block and a length of resource blocks within the UE-specific BWP for that respective UE computing device. In some aspects, each respective virtual BWP may be identified by one or more control resource set (CORESET) bandwidth configurations based on a configuration of that respective UE computing device. In some aspects, the respective UE computing device may have a single CORESET for multicast and a lowest resource block index and a highest resource block index of the CORESET corresponds to the virtual BWP. In some aspects, the respective UE computing device may have multiple CORESETs for multicast and a lowest resource block index among the multiple CORESETs and a highest resource block index among the multiple CORESETs correspond to the virtual BWP. In some aspects, the virtual BWP may have a lowest resource block index within the UE-specific BWP without any specified bandwidth for the virtual BWP. In some aspects, the one or more UE computing devices may be configured to interpret down link control information (DCI) scheduling multicast data such that a lowest resource block index of the DCI frequency domain resource allocation field is the initial physical resource block of the virtual BWP.

Some aspects include methods that may be performed by a processor of a UE computing device, which may include receiving an indication of a multicast BWP within a carrier bandwidth from a 5G-NR base station; and receiving multicast data from the 5G-NR base station in the multicast BWP. In some aspects, the multicast BWP may be a UE-common BWP configured to be used by at least a portion of the one or more UE computing devices in communication with the 5G-NR base station. In some aspects, the indication of the UE-common BWP may indicate resource allocation related parameters such that a lowest RB index of the UE-common BWP is an initial PRB of the UE-common BWP.

Some aspects may further include receiving an indication of a search space set for multicast. In some aspects, the search space set for multicast may be a search space set for multicast or unicast.

Some aspects may further include receiving an indication of a time switching pattern from the base station. In some aspects, receiving the indication of the time switching pattern may include receiving the indication of the time switching pattern in a RRC message. In some aspects, receiving the indication of the time switching pattern may include receiving the indication of the time switching pattern in a DCI.

In some aspects, the multicast BWP may be a virtual BWP. In some aspects, the virtual BWP may be identified by one or more CORESET bandwidth configurations. In some aspects, a single CORESET for multicast may be configured on the UE computing device and a lowest resource block index and a highest resource block index of the CORESET corresponds to the virtual BWP. In some aspects, multiple CORESETs for multicast may be configured on the UE computing device and a lowest resource block index among the multiple CORESETs and a highest resource block index among the multiple CORESETs correspond to the virtual BWP.

Further aspects may include a wireless device having a processor configured to perform one or more operations of the methods summarized above. Further aspects may include a non-transitory processor-readable storage medium having stored thereon processor-executable instructions configured to cause a processor of a wireless device to perform operations of the methods summarized above. Further aspects include a wireless device having means for performing functions of the methods summarized above. Further aspects include a system on chip for use in a wireless device that includes a processor configured to perform one or more operations of the methods summarized above. Further aspects include a system in a package that includes two systems on chip for use in a wireless device that includes a processor configured to perform one or more operations of the methods summarized above.

Further aspects may include a network computing device having a processor configured to perform operations of any of the methods summarized above. Further aspects may include a non-transitory processor-readable storage medium having stored thereon processor-executable instructions configured to cause a processor of a network computing device to perform operations of any of the methods summarized above. Further aspects include a network computing device having means for performing functions of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
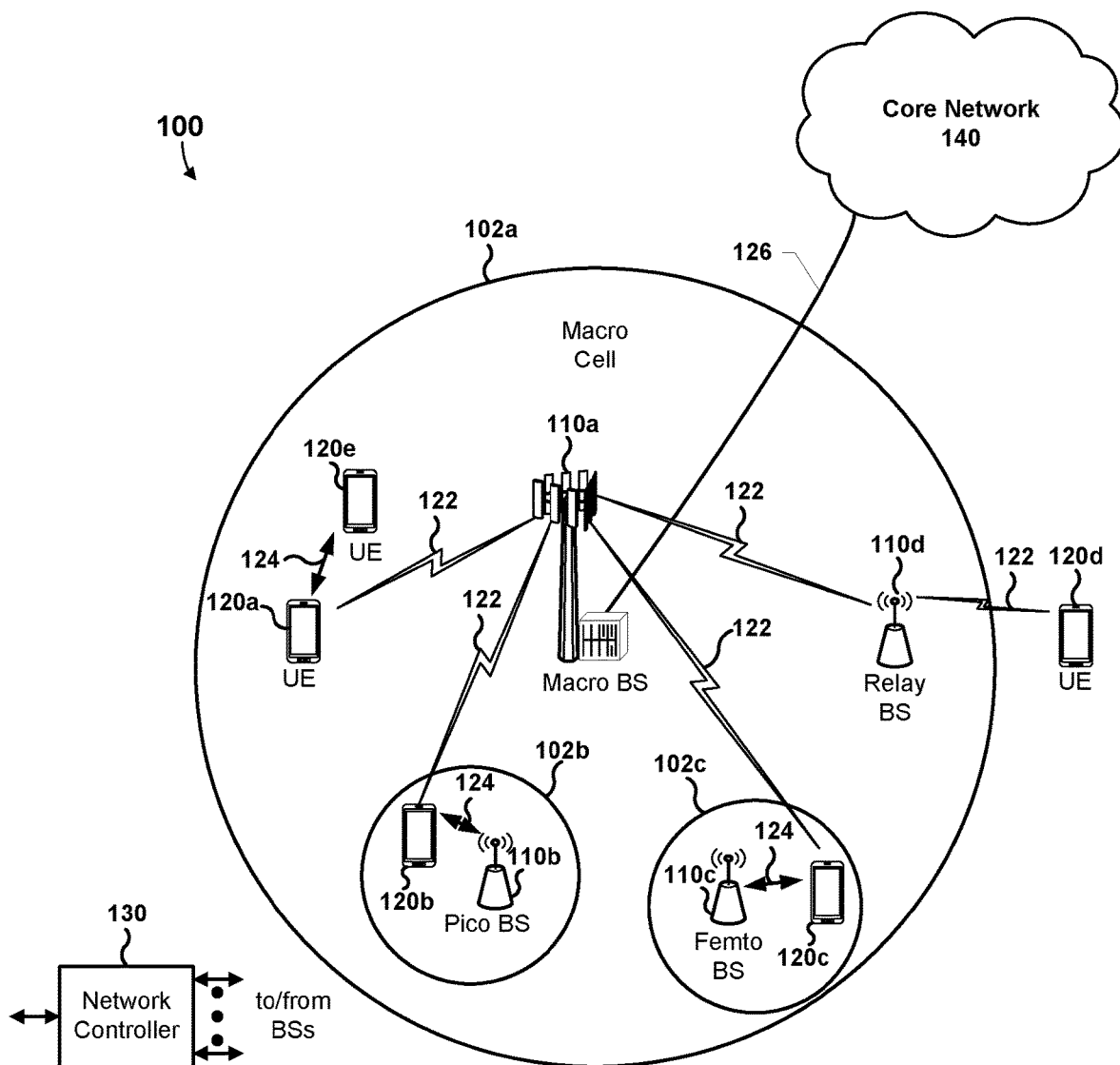
FIG. 1 is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments provide base station-implemented and user equipment (UE) computing device implemented methods for radio resource allocation to support multicast services from a 5G-NR network to support multicast services from a 5G-NR base station. Various embodiments may include determining a multicast bandwidth part (BWP)

within a carrier bandwidth, sending an indication of the multicast BWP to one or more UE computing devices in communication with the base station, and scheduling transmission of multicast data in the multicast BWP. By scheduling transmission of multicast data in the multicast BWP, various embodiments may enable multicast service delivery to wireless devices in a 5G-NR network.

The terms "wireless device" and "user equipment (UE) computing device" are used interchangeably herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The term "multicore processor" may be used herein to refer to a single integrated circuit (IC) chip or chip package that contains two or more independent processing cores (e.g., CPU core, Internet protocol (IP) core, graphics processor unit (GPU) core, etc.) configured to read and execute program instructions. A SOC may include multiple multicore processors, and each processor in an SOC may be referred to as a core. The term "multiprocessor" may be used herein to refer to a system or device that includes two or more processing units configured to read and execute program instructions.

In 5G-NR, various parameters are associated with a bandwidth part (BWP) configuration. Such parameters may include subcarrier spacing (SCS), cyclic prefix (CP) length, resource block (RB) indexing, resource allocation (RA) type, and resource block group (RBG) size. In 5G-NR, downlink control information (DCI) field sizes may be dependent on the active BWP configuration. As such, when a user equipment (UE) is configured with multiple BWPs, the DCI field size follows the current active BWP for the UE. For DCI-based BWP-switching, each DCI field is interpreted based on the newly active BWP. For a DCI field, if the number of bits necessary for the newly active BWP (e.g., k1 bits) is smaller than that for the previous active BWP (e.g., k2 bits), the (k2-k1) most significant bit (MSB) bits for the DCI field are set to zero. If the number of bits necessary for the newly active BWP (e.g., k1 bits) is bigger than that for the previous active BWP (e.g., k2 bits), the UE considers (k1-k2) MSB bits for the DCI field to be set to zero.

In 5G-NR, multicast transmissions should be able to be received by multiple UEs. To enable multicast transmissions to be received by multiple UEs, the SCS, CP length, RB indexing, RA type, and RBG size for multicast transmissions cannot be UE specific and tied directly to each UE's specific BWP.

Various embodiments include methods for radio resource allocation to support multicast services from a fifth generation (5G)-new radio (NR) network. Various embodiments provide a multicast BWP to support provisioning multicast services from a 5G-NR base station to one or more UE computing devices in communication with the base station.

In some embodiments, the multicast BWP may be a UE-common BWP configured to be used by at least a portion of the UE computing devices in communication with the base station. In some embodiments, the multicast BWP may be a UE-common BWP configured to be used by specific UE computing devices in communication with the base station that are configured to monitor the UE-common BWP, such as by higher-layer configuration signaling from the base station or other network computing device. Such specific UE computing devices configured to monitor the UE-common BWP may be all UE computing devices in communication with the base station or less than all UE computing devices in communication with the base station, such as a subset of one or more UE computing devices in communication with the base station. In some embodiments, the multicast BWP may be a UE-common BWP configured to be used by all UE computing devices in communication with the base station. In various embodiments, resource allocation related parameters may be provided in the UE-common BWP configuration. A UE receiving the UE-common BWP may activate the UE-common BWP to receive the multicast services broadcast by the base station. In some embodiments, the indication of the UE-common BWP may indicate resource allocation related parameters such that a receiving UE considers a lowest resource block (RB) index of the UE-common BWP as an initial physical resource block (PRB) (e.g., PRB #0) of the UE-common BWP.

In some embodiments, the UE-common BWP may have the same SCS and CP length of an active UE-specific BWP and the UE-common BWP may be fully contained within the UE-specific BWP. In such cases, the UE may monitor the physical downlink control channel (PDCCH) search space sets for unicast (C-RNTI) and for multicast (G-RNTI) for the same serving cell and the network (e.g., the base station) can schedule either unicast or multicast (or both) simultaneously at the same time. In some embodiments, search space (SS) sets for unicast and multicast may be configured in the UE-specific BWP and UE-common BWP configurations separately and respectively. In some embodiments, the UE may be configured to monitor the PDCCH for unicast and the PDCCH for multicast in the SS sets in both the UE-specific BWP and UE-common BWP configurations for the same serving cell at the same time. Monitoring both the PDCCH for unicast and the PDCCH for multicast in the SS sets may reduce a likelihood of PDCCH blocking.

In some embodiments, the UE-common BWP may have a different SCS or CP length than an active UE-specific BWP, or the UE-common BWP may not be fully contained within the UE-specific BWP. In such cases, should the UE not be capable of activating more than one BWP at a time, the UE-specific BWP and the UE-common BWP may be time-switched. In some embodiments, the indication of the time switching pattern may be sent in radio resource control (RRC) message. In some embodiments, the indication of the time switching pattern may be sent in downlink control information (DCI). For DCI-indicated BWP switching, a BWP indicator field in the DCI may be used to indicate which BWP, the UE-specific BWP or the UE-common BWP, to use. For example, when a DCI in UE-specific BWP indicates BWP-switching to a UE-common BWP, the DCI may indicate BWP switching and the DCI may schedule multicast data in the UE-common BWP. For example, when a DCI in UE-common BWP indicates BWP-switching to a UE-specific BWP, the DCI indicates BWP switching to a particular UE-specific BWP, but does not schedule data in the UE-specific BWP. In Rel.15 BWP switching, a UE assumes that a BWP switching indication by a DCI schedules a physical downlink shared channel (PDSCH) or a physical uplink shared channel (PUSCH) in the newly activated BWP. For BWP switching from the UE-common BWP to a UE-specific BWP, the UE may not assume that a DCI indicating BWP switching does not schedule a PDSCH or a PUSCH in the newly activated BWP. This can avoid the case where many UEs need to be scheduled at one time due to the BWP switching.

In some embodiments, the multicast BWP may be a virtual BWP. In some embodiments, the virtual BWP may not be a defined actual BWP, but rather the virtual BWP may be a subset of parameters of a BWP. The virtual BWP may be configured by the base station to be fully contained in a UE-specific BWP with the same SCS and CP length. In various embodiments, the network (e.g., the base station) may configure the virtual BWP such that the UEs receiving the same multicast service may have active BWPs that fully contain the virtual BWP. In some embodiments, the virtual BWP may be identified to a UE by a configuration element, such as a starting RB and RB length element. In some embodiments, the bandwidth of the virtual BWP may be identified to a UE by a control resource set (CORESET) bandwidth configuration. As an example, the UE may be configured with a particular CORESET for multicast. The virtual BWP bandwidth may be determined by the lowest and the highest RB indexes of the CORESET for multicast. In some embodiments, should the UE be configured with multiple special CORESETs for multicast, the virtual BWP bandwidth may be determined to be at the union of the multiple CORESETs (e.g., the lowest RB index among the CORESETs to the highest RB index among the CORESETs). In some embodiments, the virtual BWP may be transparent to the UE. For example, a UE may be configured with an offset value or virtual PRB #0, but may not be configured with a specific bandwidth for the virtual BWP. For multicast data resource allocation, the UE may determine the configured RB index associated with the offset value or the virtual PRB #0 as the lowest RB index, and may be configured so as to expect the scheduled multicast data to not exceed the active BWP bandwidth (e.g., the UE expects that the network (e.g., the base station) will not transmit multicast data outside the UE-specific BWP). In such an example, DCI field sizes may be the same for unicast and multicast. In such an example virtual BWP configuration, when a UE detects a downlink (DL) DCI, depending on whether the DL DCI schedules unicast data or multicast data, the UE interprets the DCI frequency-domain resource allocation field such that PRB #0 or virtual PRB #0 is the lowest RB index of the resource allocation. Whether the DL DCI schedules unicast data or multicast data may be identified by radio network temporary identifier (RNTI) scrambling of the cyclic redundancy check (CRC) of the DCI (e.g., G-RNTI or C-RNTI/MCS-C-RNTI/CS-RNTI), the DL DCI payload size, and/or the DL DCI format.

FIG. 1 is a system block diagram illustrating an example communication system 100 suitable for implementing any of the various embodiments. The communications system 100 may be a 5G New Radio (NR) network, or any other suitable network such as an LTE network, 5G network, etc. While FIG. 1 illustrates a 5G network, later generation networks may include the same or similar elements. Therefore, reference to a 5G network and 5G network elements in the following descriptions is for illustrative purposes and is not intended to be limiting.

The communications system 100 may include a heterogeneous network architecture that includes a core network 140 and a variety of mobile UE computing devices (illustrated as wireless devices 120a-120e in FIG. 1). The communications system 100 may also include a number of base stations (illustrated as the BS 110a, the BS 110b, the BS 110c, and the BS 110d) and other network entities. A base station is an entity that communicates with wireless devices, and also may be referred to as a Node B, an LTE Evolved nodeB (eNodeB or eNB), an access point (AP), a Radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station Subsystem serving this coverage area, or a combination thereof, depending on the context in which the term is used. The core network 140 may be any type of core network, such as an LTE core network (e.g., an Evolved Packet Core (EPC) network), 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and transmit the data to a downstream station (for example, a wireless device or a base station). A relay station also may be a mobile device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, user equipment (UE), etc.

A macro base station 110a may communicate with the communication network 140 over a wired or wireless communication link 126. The wireless device 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more Radio access technologies (RATs). Examples of RATs that may be used in a wireless communication link include 3GPP LTE, 3G, 4G, 5G (e.g., NR), GSM, CDMA, WCDMA, Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum Resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 Resource blocks), and there may be 1, 2, 4, 8 or 16 subbands for system bandwidth of 1.25, 2.5, 5, 10 or 20 MHz, respectively.

While descriptions of some embodiments may use tell sinology and examples associated with LTE technologies, some embodiments may be applicable to other wireless communications systems, such as a new Radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR Resource blocks may span 12 sub-carriers with a sub-carrier bandwidth of 75 kHz over a 0.1 millisecond (ms) duration. Each Radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or Evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband Internet of things) devices. A wireless device 120a-e may be included inside a housing that houses components of the wireless device, such as processor components, memory components, similar components, or a combination thereof.

In general, any number of communication systems and any number of wireless networks may be deployed in a given geographic area. Each communications system and wireless network may support a particular Radio access technology (RAT) and may operate on one or more frequencies. A RAT also may be referred to as a Radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some embodiments, two or more wireless devices 120a-e (for example, illustrated as the wireless device 120a and the wireless device 120e) may communicate directly using one or more sidelink channels 124 (for example, without using a base station 110a-110d as an intermediary to communicate with one another). For example, wireless device 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-e may perform scheduling operations, resource selection operations, as well as other operations described elsewhere herein as being performed by the base station 110a.

Figure 2:
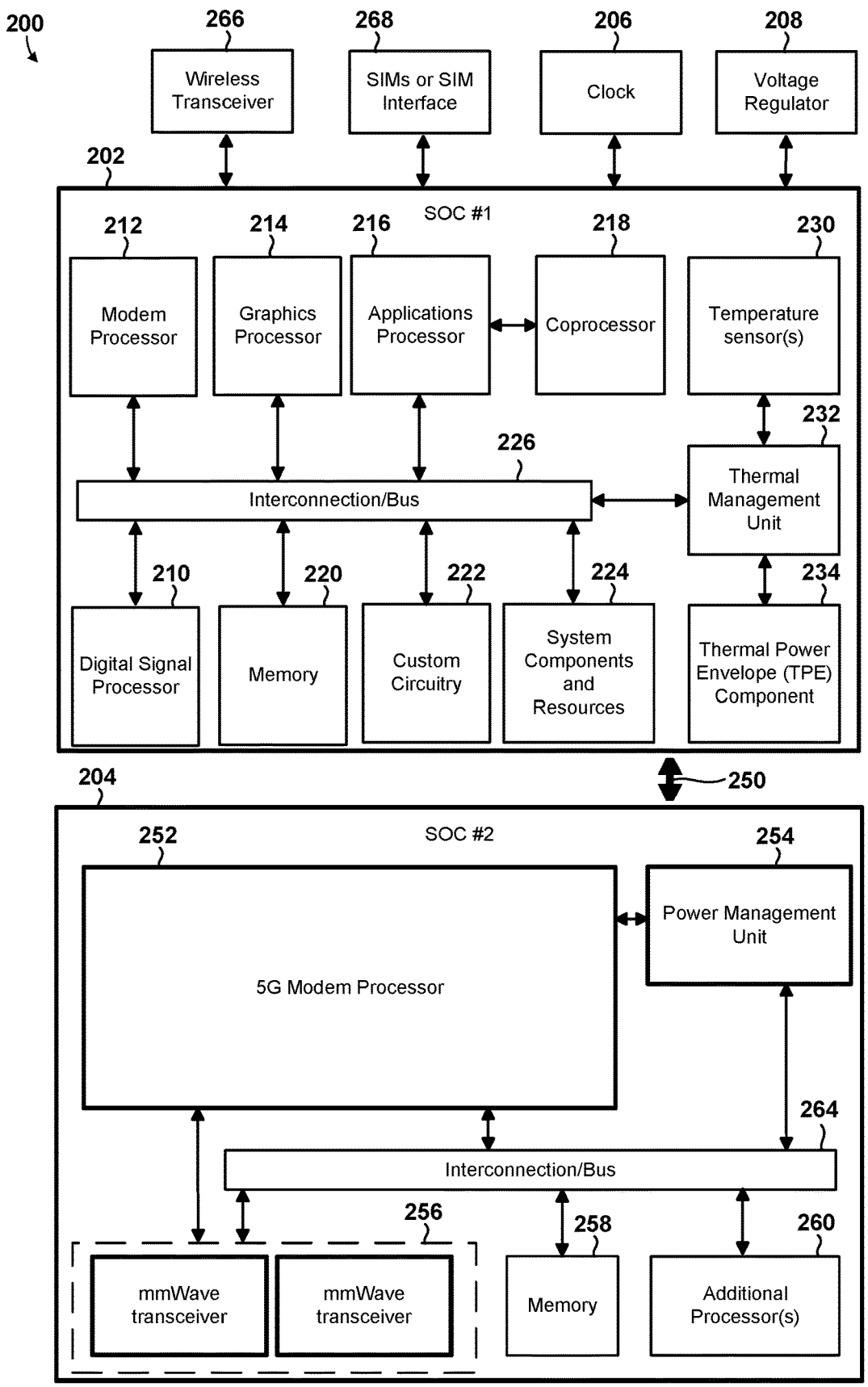
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example wireless device 200 (which may be a SIP in some embodiments) includes a two SOCs 202, 204 coupled to a clock 206, a voltage regulator 208, at least one SIM 268 and/or a SIM interface and a wireless transceiver 266 configured to send and receive wireless communications via an antenna (not shown) to/from network wireless devices, such as a base station 110a. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor (AP) 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206, a voltage regulator 208, one or more wireless transceivers 266, and at least one SIM 268 and/or SIM interface (i.e., an interface for receiving one or more SIM cards). Resources external to the SOC (e.g., clock 206, voltage regulator 208) may be shared by two or more of the internal SOC processors/cores. The at least one SIM 268 (or one or more SIM cards coupled to one or more SIM interfaces) may store information supporting multiple subscriptions, including a first 5GNR subscription and a second 5GNR subscription, etc.

In addition to the example SIP 200 discussed above, various embodiments may be implemented in a wide variety of computing systems, which may include a single processor, multiple processors, multicore processors, or any combination thereof.

Figure 3A:
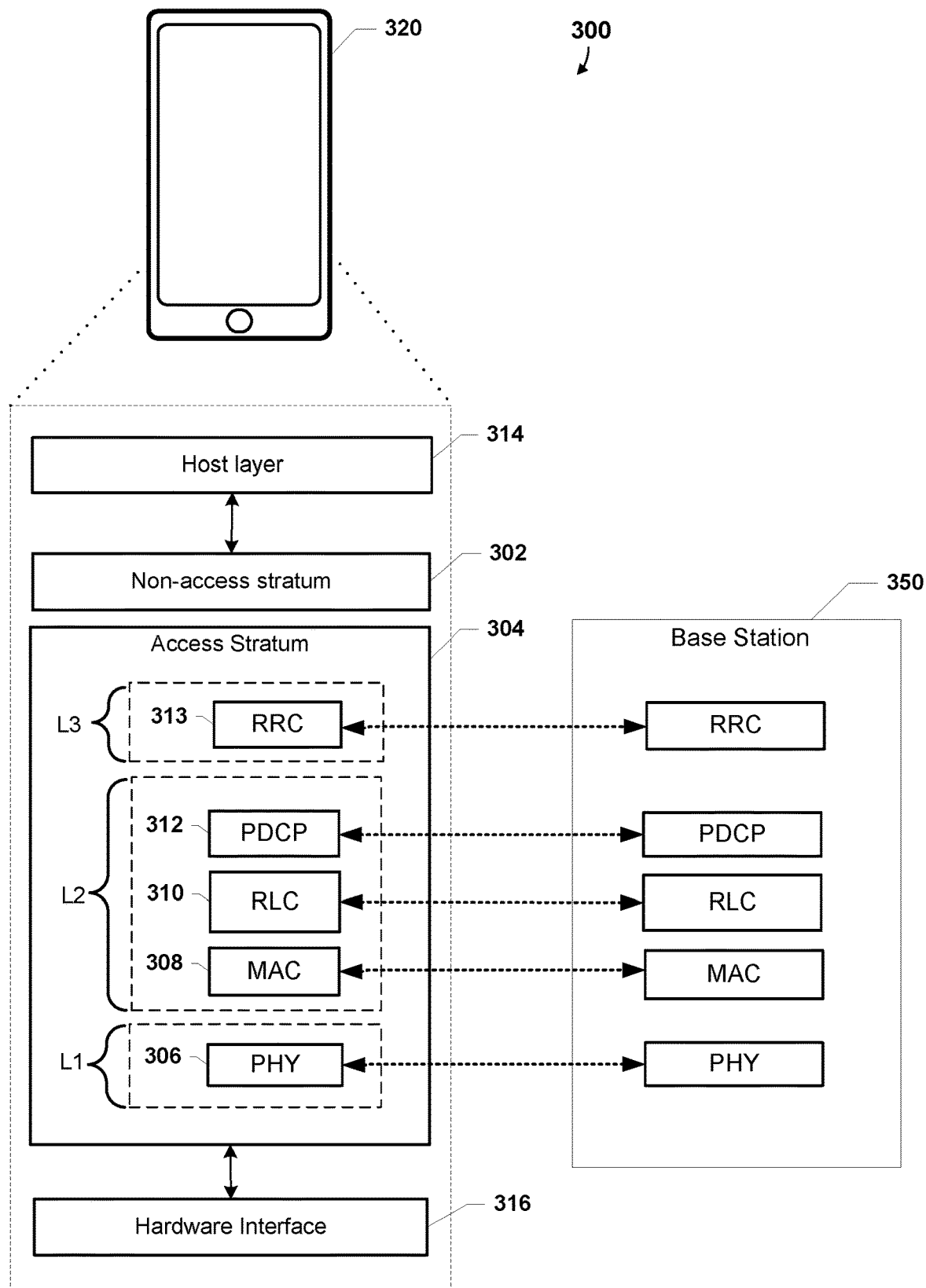
FIG. 3A is a diagram illustrating an example of a software architecture including a radio protocol stack for the user and control planes in wireless communications in accordance with various embodiments.

FIG. 3A illustrates an example of a software architecture 300 including a radio protocol stack for the user and control planes in wireless communications between a base station 350 (e.g., the base station 110a) and a wireless device (UE computing device) 320 (e.g., the wireless device 120a-120e, 200). With reference to FIGS. 1-3A, the wireless device 320 may implement the software architecture 300 to communicate with the base station 350 of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions INCLUDING broadcasting system information, paging, and establishing and releasing an RRC signaling connection between the wireless device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., IP layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 3B:
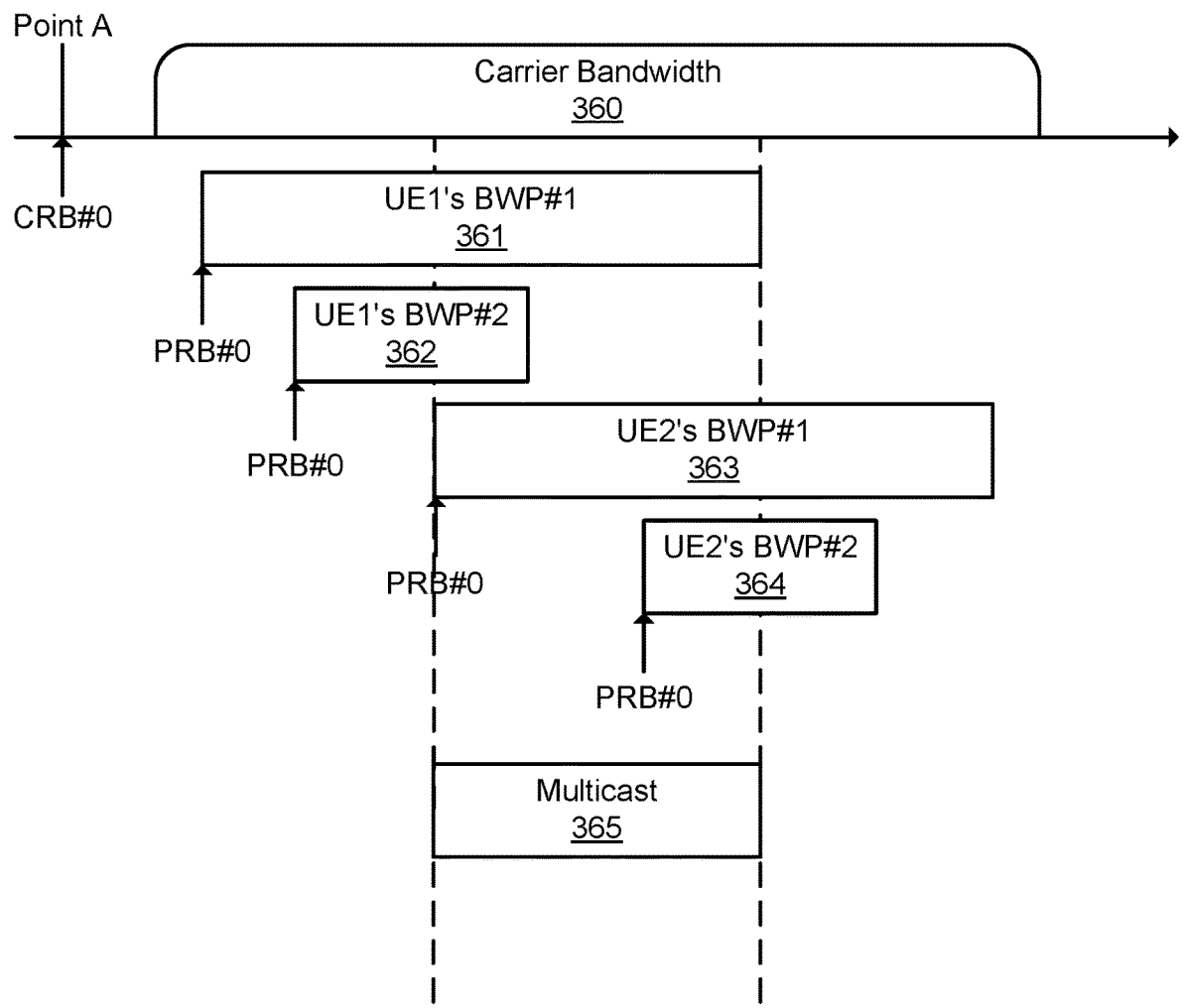
FIG. 3B is a diagram illustrating allocations in a carrier bandwidth.

FIG. 3B is a diagram illustrating allocations in a carrier bandwidth 360. With reference to FIGS. 1-3B, the carrier bandwidth 360 may be defined relative to an initial carrier resource block (CRB), such as CRB #0 at Point A. The carrier bandwidth 360 may be the frequency band over which a 5G-NR base station (e.g., the base station 110a, 330) provides services to UEs in communication with the base station. BWPs for UE computing devices (e.g., the wireless device 120a-120e, 200, 320) may be defined within the carrier bandwidth 360 such that the UEs may receive services in the carrier bandwidth 360. In some embodiments, UEs may have one or more BWP. In some embodiments, a UE may activate only one BWP at a time. In some embodiments, a UE may activate more than one BWP at a time. FIG. 3B illustrates four example BWPs, UE1's BWP #1 361, UE1's BWP #2 362, UE2's BWP #1 363, and UE2's BWP #1 364. Each BWP 321-364 may have its own respective PRB indexing starting from zero (e.g., PRB #0). As illustrated in FIG. 3B, multicast services 365 may be transmitted by the base station in a portion of the carrier bandwidth 360. Based on the overlap between the BWPs, UE1 and UE2 may receive the multicast services 365 if UE1 activates BWP #1 361 and UE2 activates BWP #2 363. However, if UE1 activates BWP #2 362 and UE2 activates BWP #2 364, UE1 and UE2 will not receive the multicast services 365. Additionally, UE1's BWP #1 361 and UE2's BWP #1 363 have non-aligned PRB indexing and the configured SCS, CP length, RA Type, etc. for the BWPs may be different. The multiple different UE-specific BWPs of UEs in communication with a base station and the failure of UE-specific BWPs to necessarily overlap the multicast transmissions complicates radio resource allocation to support multicast services from a 5G-NR base station to UEs in communication with the base station.

Figure 4:
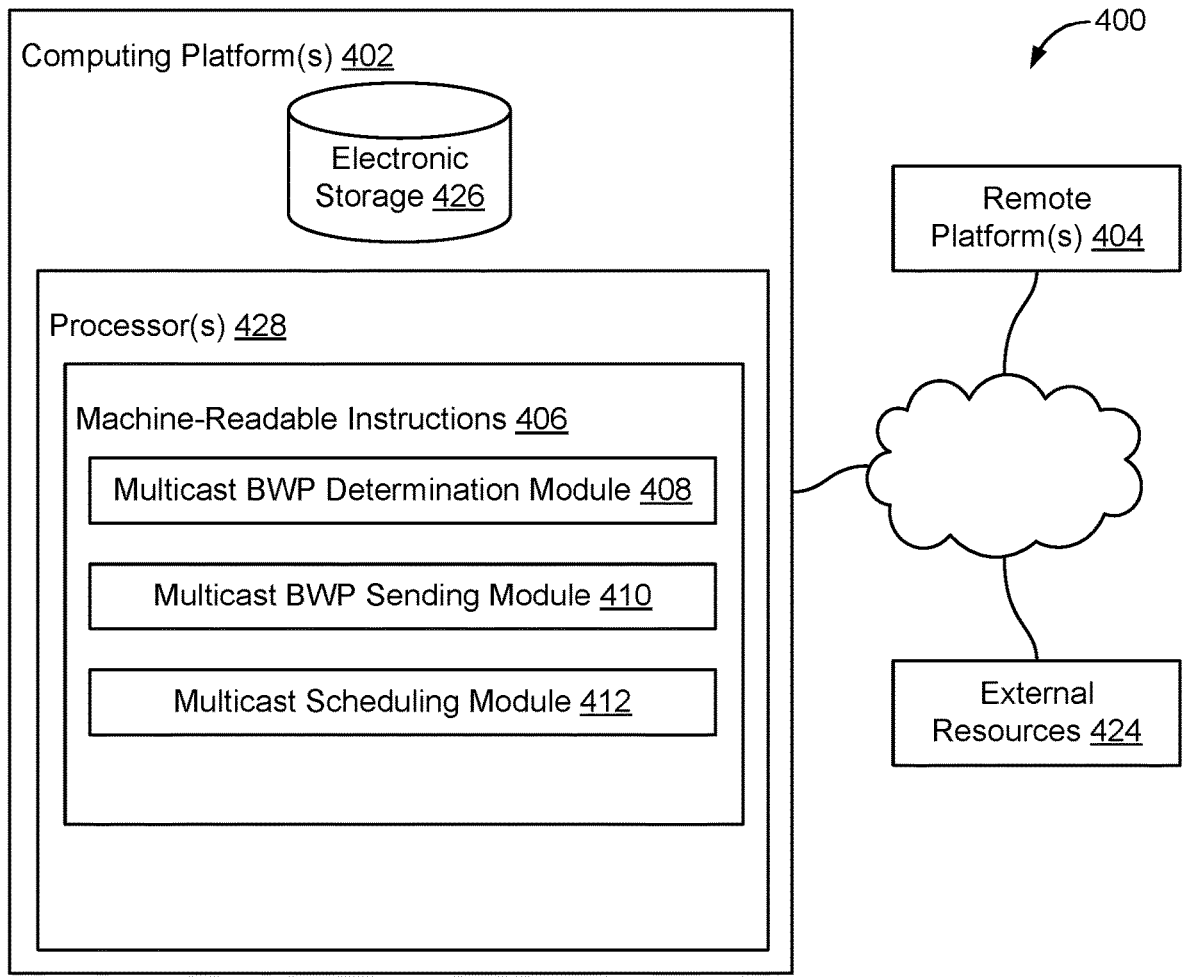
FIG. 4 is a component block diagram illustrating a system configured for radio resource allocation to support multicast services from a fifth generation (5G)-new radio (NR) base station in accordance with various embodiments.

FIG. 4 is a component block diagram illustrating a system 400 configured for radio resource allocation to support multicast services 5G-NR in accordance with various embodiments. In some embodiments, system 400 may include one or more computing platforms 402 and/or one or more remote platforms 404. With reference to FIGS. 1-4, computing platform(s) 402 may include a base station (e.g., the base station 110, 350) and/or a wireless device (e.g., the wireless device 120a-120e, 200, 320). Remote platform(s) 404 may include a base station (e.g., the base station 110, 350) and/or a wireless device (e.g., the wireless device 120a-120e, 200, 320).

Computing platform(s) 402 may be configured by machine-readable instructions 406. Machine-readable instructions 406 may include one or more instruction modules. The instruction modules may include computer program modules. The instruction modules may include one or more of multicast BWP determination module 408, multicast BWP sending module 410, multicast scheduling module 412, and/or other instruction modules.

Multicast BWP determination module 408 may be configured to determine a multicast BWP within a carrier bandwidth. The base station may be a serving cell. In some embodiments, the multicast BWP may be a UE-common BWP configured to be used by at least a portion of the UE computing devices in communication with the base station. In some embodiments, the multicast BWP may be a UE-common BWP configured to be used by specific UE computing devices in communication with the base station that are configured to monitor the UE-common BWP, such as by higher-layer configuration signaling from the base station or other network computing device. Such specific UE computing devices configured to monitor the UE-common BWP may be all UE computing devices in communication with the base station or less than all UE computing devices in communication with the base station, such as a subset of one or more UE computing devices in communication with the base station. In some embodiments, the multicast BWP may be a UE-common BWP configured to be used by all UE computing devices in communication with the base station. In various embodiments, resource allocation related parameters may be provided in the UE-common BWP configuration. In some embodiments, the multicast BWP determination module 408 may be configured to, for each of the one or more UE computing devices in communication with the base station, to determine whether the UE-common BWP has a same SCS and CP length as a UE-specific BWP and the UE-common BWP is fully contained within the UE specific BWP. In some embodiments, the multicast BWP determination module 408 may be configured to, for each of the one or more UE computing devices in communication with the base station, determine a time switching pattern for the respective UE computing device in response to determining that the UE-common BWP has a different SCS or CP length as the UE-specific BWP or the UE-common BWP is not fully contained within the UE specific BWP. In some embodiments, the multicast BWP may be a virtual BWP. In some embodiments, the virtual BWP may not be a defined actual BWP, but rather the virtual BWP may be a subset of parameters of a BWP. The virtual BWP may be configured by the base station to be fully contained in a UE-specific BWP with the same SCS and CP length. In various embodiments, the network (e.g., the base station) may configure the virtual BWP such that the UEs receiving the same multicast service may have active BWPs that fully contain the virtual BWP.

Multicast BWP sending module 410 may be configured to send an indication of the multicast BWP to one or more UE computing devices in communication with the base station. A UE receiving the UE-common BWP may activate the UE-common BWP to receive the multicast services broadcast by the base station. In some embodiments, the indication of the UE-common BWP may indicate resource allocation related parameters such that a receiving UE considers a lowest resource block (RB) index of the UE-common BWP as an initial physical resource block (PRB) (e.g., PRB #0) of the UE-common BWP. In some embodiments, the multicast BWP sending module 410 may be configured to, for each of the one or more UE computing devices in communication with the base station, an indication of a search space set for multicast to the respective UE computing device in response to determining that the UE-common BWP has a SCS and CP length as the UE-specific BWP and the UE-common BWP is fully contained within the UE specific BWP. In some embodiments, the multicast BWP sending module 410 may be configured to, for each of the one or more UE computing devices in communication with the base station, send an indication of the time switching pattern for the respective UE computing device to the respective UE computing device.

Multicast scheduling module 412 may be configured to schedule transmission of multicast data in the multicast BWP.

Figure 5A:
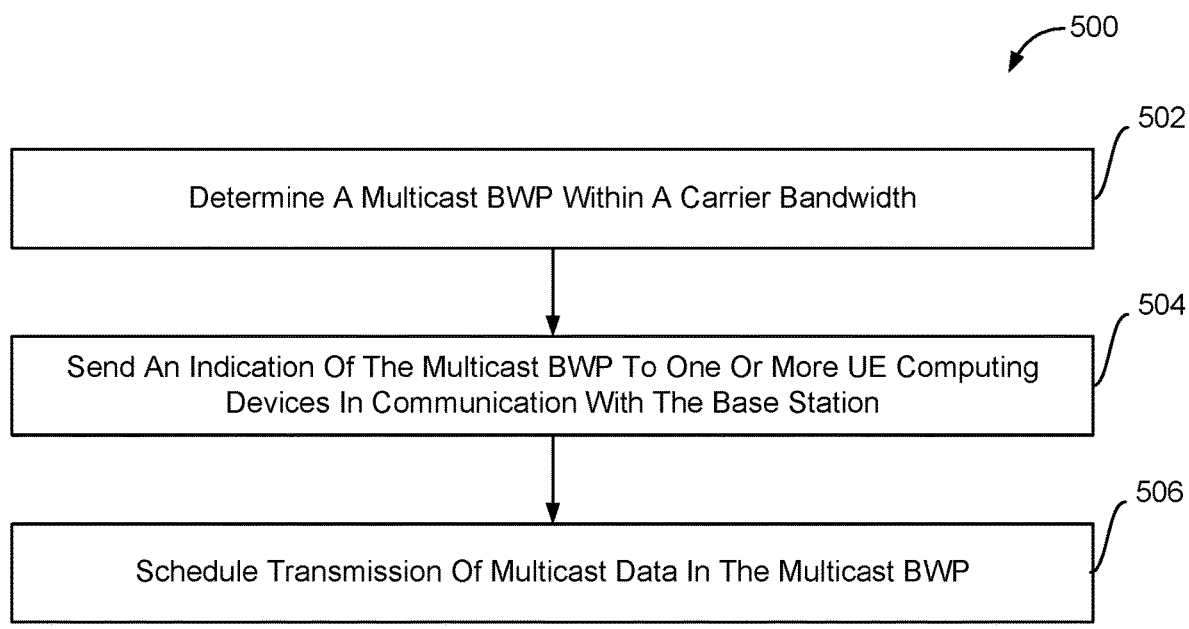
FIG. 5A is a process flow diagram illustrating a method for radio resource allocation to support multicast services from a 5G-NR base station in accordance with various embodiments.

FIG. 5A shows a process flow diagram of an example method 500 for radio resource allocation to support multicast services from a fifth generation (5G)-new radio (NR) base station according to various embodiments. With reference to FIGS. 1-5A, the method 500 may be implemented by a processor of a base station (e.g., the base station 110, 350).

In block 502, the processor may perform operations including determining a multicast bandwidth part (BWP) within a carrier bandwidth.

In some embodiments, the multicast BWP may be a UE-common BWP configured to be used by at least a portion of the UE computing devices in communication with the base station. In some embodiments, the multicast BWP may be a UE-common BWP configured to be used by specific UE computing devices in communication with the base station that are configured to monitor the UE-common BWP, such as by higher-layer configuration signaling from the base station or other network computing device. Such specific UE computing devices configured to monitor the UE-common BWP may be all UE computing devices in communication with the base station or less than all UE computing devices in communication with the base station, such as a subset of one or more UE computing devices in communication with the base station. In some embodiments, the multicast BWP may be a UE-common BWP configured to be used by all UE computing devices in communication with the base station. In some embodiments, the indication of the UE-common BWP may indicate resource allocation related parameters such that a receiving UE considers a lowest RB index of the UE-common BWP as an initial PRB of the UE-common BWP.

In some embodiments, the multicast BWP may be a virtual BWP. In some embodiments, the virtual BWP may not be a defined actual BWP, but rather the virtual BWP may be a subset of parameters of a BWP. The virtual BWP may be configured by the base station to be fully contained in a UE-specific BWP with the same SCS and CP length. In various embodiments, the network (e.g., the base station) may configure the virtual BWP such that the UEs receiving the same multicast service may have active BWPs that fully contain the virtual BWP. In some embodiments, the virtual BWP may be fully contained within a UE-specific BWP with a same SCS and CP length for each of the one or more UE computing devices. In some embodiments, each respective virtual BWP may be identified by a starting resource block and a length of resource blocks within the UE-specific BWP for that respective UE computing device. In some embodiments, each respective virtual BWP may be identified by one or more CORESET bandwidth configurations based on a configuration of that respective UE computing device. In some embodiments, the respective UE computing device may have a single CORESET for multicast and a lowest resource block index and a highest resource block index of the CORESET corresponds to the virtual BWP. In some embodiments, the respective UE computing device may have multiple CORESETs for multicast and a lowest resource block index among the multiple CORESETs and a highest resource block index among the multiple CORESETs correspond to the virtual BWP. In some embodiments, the virtual BWP may have a lowest resource block index within the UE-specific BWP without any specified bandwidth for the virtual BWP. In some embodiments, the one or more UE computing devices may be configured to interpret down link control information (DCI) scheduling multicast data such that a lowest resource block index of the DCI frequency domain resource allocation field is the initial physical resource block of the virtual BWP.

In block 504, the processor may perform operations including sending an indication of the multicast BWP to one or more UE computing devices in communication with the base station. In some embodiments, the indication of the UE-common BWP may indicate resource allocation related parameters such that a receiving UE considers a lowest RB index of the UE-common BWP as an initial PRB (e.g., PRB #0) of the UE-common BWP. In some embodiments, the virtual BWP may be identified to a UE by a configuration element, such as a starting RB and RB length element. In some embodiments, the virtual BWP may be identified to a UE by a control resource set (CORESET) bandwidth configuration. In some embodiments, the virtual BWP may be transparent to the UE. For example, a UE may be configured with an offset value or virtual PRB #0, but may not be configured with a specific bandwidth for the virtual BWP.

In block 506, the processor may perform operations including scheduling transmission of multicast data in the multicast BWP. In some embodiments, a UE receiving the UE-common BWP may activate the UE-common BWP to receive the multicast services broadcast by the base station. In various embodiments, the network (e.g., the base station) may configure the virtual BWP such that the UEs receiving the same multicast service may have active BWPs that fully contain the virtual BWP.

Figure 5B:
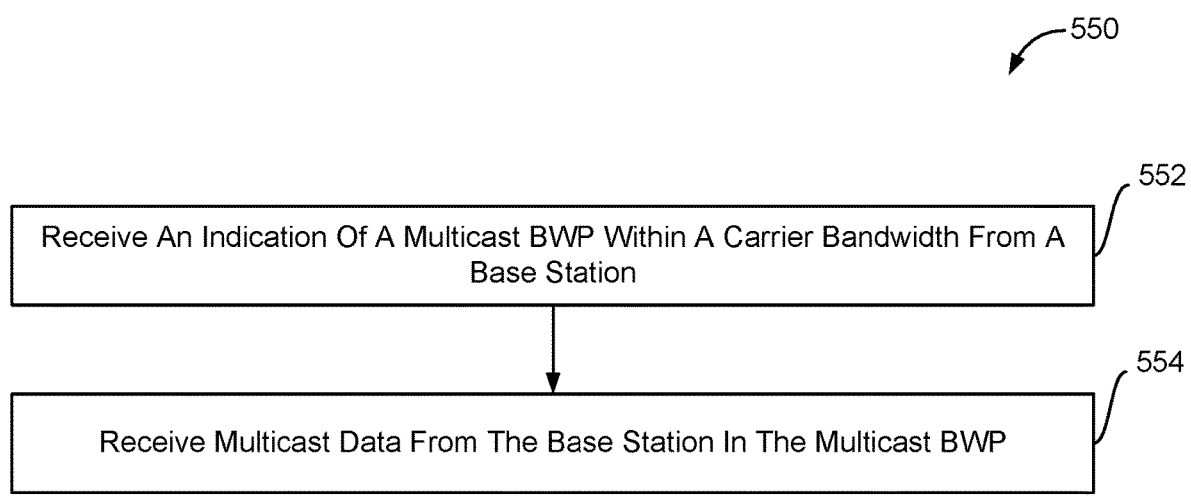
FIG. 5B is a process flow diagram illustrating a method for radio resource allocation that may be performed in a UE computing device for receiving multicast services from a 5G-NR base station in accordance with various embodiments.

FIG. 5B shows a process flow diagram of an example method 550 for radio resource allocation that may be performed in a UE computing device for receiving multicast services from a 5G-NR base station according to various embodiments. With reference to FIGS. 1-5B, the method 550 may be implemented by a processor of a UE computing device (e.g., the wireless device 120a-120e, 200, 320). In various embodiments, the operations of the method 550 may be performed by a processor of a UE computing device in communication with a 5G-NR base station, such as a 5G-NR base station configured to perform operations of the method 500 (FIG. 5A).

In block 552, the processor of the UE computing device may perform operations including receiving an indication of a multicast BWP within a carrier bandwidth from a base station, such as a 5G-NR base station. In some embodiments, the multicast BWP may be a UE-common BWP configured to be used by at least a portion of the UE computing devices in communication with the base station. In some embodiments, the multicast BWP may be a UE-common BWP configured to be used by specific UE computing devices in communication with the base station that are configured to monitor the UE-common BWP, such as by higher-layer configuration signaling from the base station or other network computing device. Such specific UE computing devices configured to monitor the UE-common BWP may be all UE computing devices in communication with the base station or less than all UE computing devices in communication with the base station, such as a subset of one or more UE computing devices in communication with the base station. In some embodiments, the multicast BWP may be a UE-common BWP configured to be used by all UE computing devices in communication with the base station. In some embodiments, the indication of the UE-common BWP may indicate resource allocation related parameters such that a lowest RB index of the UE-common BWP is an initial PRB of the UE-common BWP.

In some embodiments, the multicast BWP may be a virtual BWP. In some embodiments, the virtual BWP may not be a defined actual BWP, but rather the virtual BWP may be a subset of parameters of a BWP. The virtual BWP may be configured by the base station to be fully contained in a UE-specific BWP with the same SCS and CP length. In various embodiments, the network (e.g., the base station) may configure the virtual BWP such that at least a portion of the UEs receiving the same multicast service (e.g., all UEs receiving the same multicast service, a subset of less than all the UEs receiving the same multicast service, etc.)

may have active BWPs that fully contain the virtual BWP. In some embodiments, the virtual BWP may be fully contained within a UE-specific BWP with a same SCS and CP length for the UE computing devices. In some embodiments, the virtual BWP may be identified by a starting resource block and a length of resource blocks within the UE-specific BWP for the UE computing device. In some embodiments, the virtual BWP may be identified by one or more CORESET bandwidth configurations. In some embodiments, the UE computing device may have a single CORESET for multicast and a lowest resource block index and a highest resource block index of the CORESET may correspond to the virtual BWP. In some embodiments, the UE computing device may have multiple CORESETs for multicast and a lowest resource block index among the multiple CORESETs and a highest resource block index among the multiple CORESETs may correspond to the virtual BWP. In some embodiments, the virtual BWP may have a lowest resource block index within the UE-specific BWP without any specified bandwidth for the virtual BWP. In some embodiments, the UE computing devices may be configured to interpret DCI scheduling multicast data such that a lowest resource block index of the DCI frequency domain resource allocation field is the initial physical resource block of the virtual BWP.

In some embodiments, the indication of the UE-common BWP may indicate resource allocation related parameters such that a lowest RB index of the UE-common BWP is an initial PRB (e.g., PRB #0) of the UE-common BWP. In some embodiments, the virtual BWP may be identified by a configuration element, such as a starting RB and RB length element. In some embodiments, the virtual BWP may be identified by a CORESET bandwidth configuration. In some embodiments, the virtual BWP may be transparent to the UE computing device. For example, a UE computing device may be configured with an offset value or virtual PRB #0, but may not be configured with a specific bandwidth for the virtual BWP.

In block 554, the processor may perform operations including receiving multicast data in the multicast BWP. In some embodiments, the UE computing device may activate the UE-common BWP to receive the multicast services broadcast by the base station. In some embodiments, the UE computing device may activate the virtual BWP to receive the multicast services broadcast by the base station.

Figure 6A:
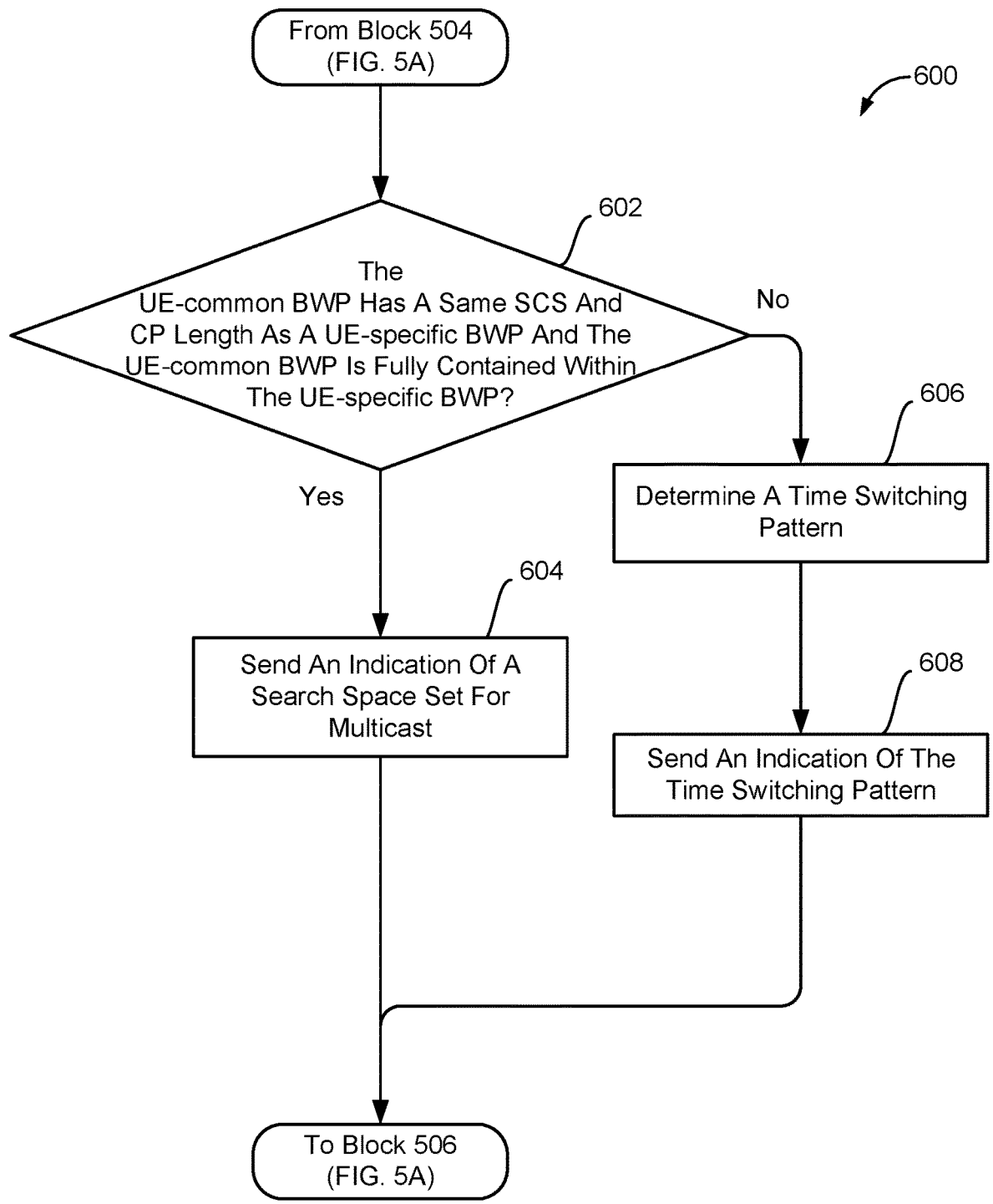
FIG. 6A is a process flow diagram illustrating a method for radio resource allocation that may be performed in a UE computing device for receiving support multicast services from a 5G-NR base station in accordance with various embodiments.

FIG. 6A is a process flow diagram illustrating a method 600 for radio resource allocation to support multicast services from a 5G-NR base station in accordance with various embodiments. With reference to FIGS. 1-6A, the method 600 may be implemented by a processor of a base station (e.g., the base station 110, 350). In various embodiments, the method 600 may be performed in conjunction with the operations of method 500 (FIG. 5A). For example, the operations of method 600 may be performed in response to sending an indication of the multicast BWP in block 504 (FIG. 5A). In various embodiments, the operations of method 600 may be performed for each of the one or more UE computing devices in communication with the base station.

In determination block 602, the processor may perform operations including determining whether the UE-common BWP has a same SCS and CP length as a UE-specific BWP and the UE-common BWP is fully contained within the UE specific BWP. In some embodiments, the UE-common BWP may have the same SCS and CP length of an active UE-specific BWP and the UE-common BWP may be fully contained within the UE-specific BWP. In some embodiments, the UE-common BWP may have a different SCS or CP length than an active UE-specific BWP, or the UE-common BWP may not be fully contained within the UE-specific BWP.

In response to determining that the UE-common BWP has a SCS and CP length as the UE-specific BWP and the UE-common BWP is fully contained within the UE specific BWP (i.e., determination block 602="Yes"), the processor may perform operations including sending an indication of a search space set for multicast in block 604. The search space set for multicast may be sent to the respective UE. In some embodiments, search space (SS) sets for unicast and multicast may be configured in the UE-specific BWP and UE-common BWP configurations separately. In some embodiments, the UE may be configured to monitor the PDCCH for unicast and the PDCCH for multicast in the SS sets in both the UE-specific BWP and UE-common BWP configurations at the same time. Monitoring both the PDCCH for unicast and the PDCCH for multicast in the SS sets may reduce a likelihood of PDCCH blocking.

In response to determining that the UE-common BWP has a different SCS or CP length as the UE-specific BWP or the UE-common BWP is not fully contained within the UE specific BWP (i.e., determination block 602="No"), the processor may perform operations including determining a time switching pattern in block 606. The time switching pattern may be unique to the respective UE computing device. Should the UE not be capable of activating more than one BWP at a time, the UE-specific BWP and the UE-common BWP may be time-switched. For DCI-indicated BWP switching, a BWP indicator field in the DCI may be used to indicate which BWP, the UE-specific BWP or the UE-common BWP, to use. For example, when a DCI in UE-specific BWP indicates BWP-switching to a UE-common BWP, the DCI may indicate BWP switching and the DCI may schedule multicast data in the UE-common BWP. For example, when a DCI in UE-common BWP indicates BWP-switching to a UE-specific BWP, the DCI indicates BWP switching to a particular BWP, but does not schedule data in the UE-specific BWP, where the particular BWP is RRC configured.

In block 608, the processor may perform operations including sending an indication of the time switching pattern. The indication of the time switching pattern may be sent to the respective UE computing device. In some embodiments, the indication of the time switching pattern may be sent in radio resource control (RRC) message. In some embodiments, the indication of the time switching pattern may be sent in down link control information (DCI).

Figure 6B:
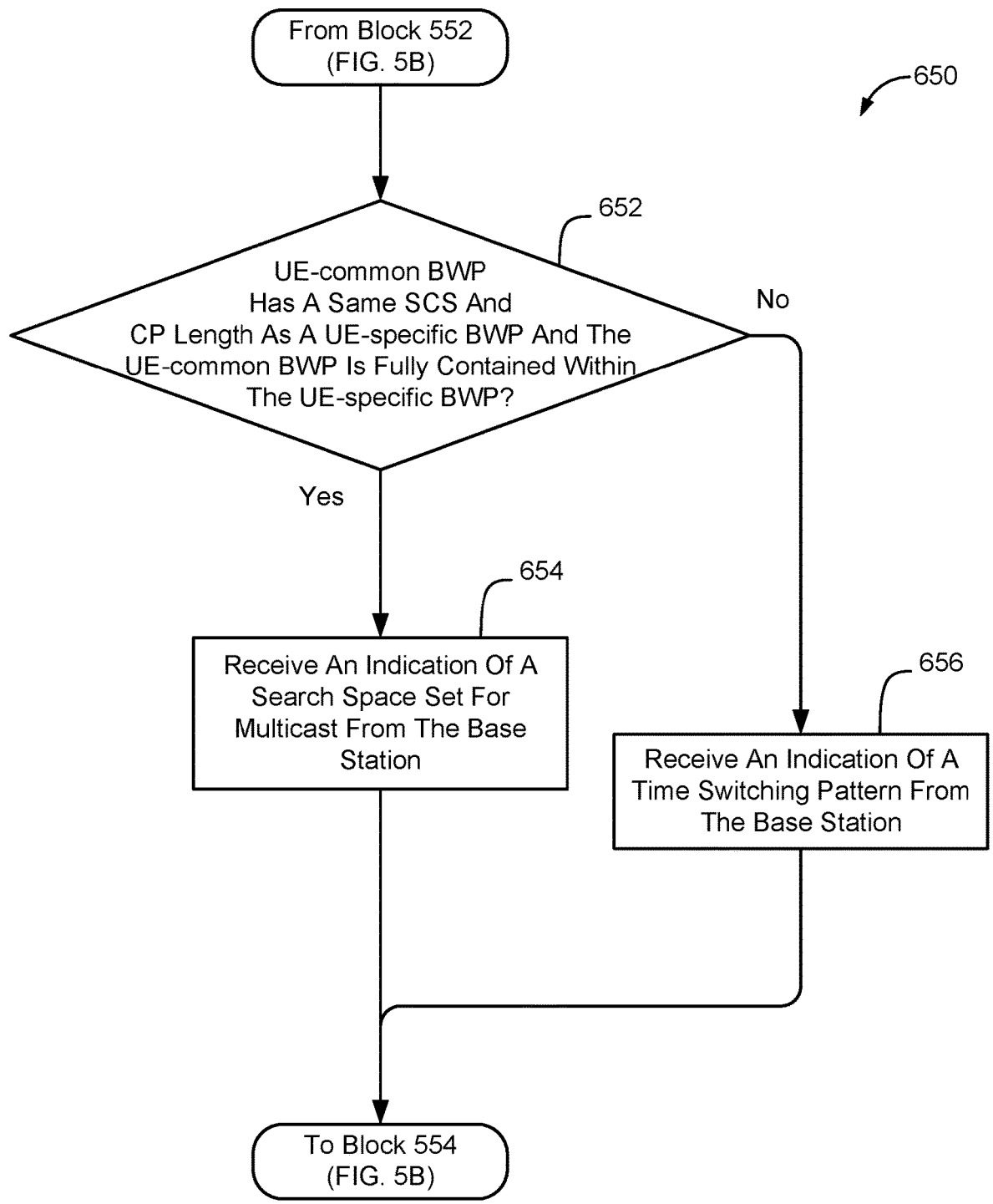
FIG. 6B is a process flow diagram illustrating a method for radio resource allocation to support multicast services from a 5G-NR base station in accordance with various embodiments.

FIG. 6B is a process flow diagram illustrating a method 650 for radio resource allocation that may be performed in a UE computing device for receiving multicast services from a 5G-NR base station in accordance with various embodiments. With reference to FIGS. 1-6B, the method 650 may be implemented by a processor of a UE computing device (e.g., the wireless device 120a-120e, 200, 320). In various embodiments, the method 650 may be performed in conjunction with the operations of the method 550 (FIG. 5B). For example, the operations of the method 650 may be performed in response to receiving an indication of the multicast BWP in block 552 (FIG. 5B). In various embodiments, the operations of the method 550 may be performed by a UE computing device in communication with a 5G-NR base station, such as a 5G-NR base station configured to perform operations of the methods 500 (FIG. 5A) and/or 600 (FIG. 6A).

In determination block 652, the processor may perform operations including determining whether the UE-common BWP has a same SCS and CP length as a UE-specific BWP and the UE-common BWP is fully contained within the UE specific BWP. In some embodiments, the UE-common BWP may have the same SCS and CP length of an active UE-specific BWP and the UE-common BWP may be fully contained within the UE-specific BWP. In some embodiments, the UE-common BWP may have a different SCS or CP length than an active UE-specific BWP, or the UE-common BWP may not be fully contained within the UE-specific BWP. The determination as to the whether the UE-common BWP has a same SCS and CP length as a UE-specific BWP and the UE-common BWP is fully contained within the UE specific BWP may be based on the indication of the multicast BWP within the carrier bandwidth received from the 5G-NR base station.

In response to determining that the UE-common BWP has a SCS and CP length as the UE-specific BWP and the UE-common BWP is fully contained within the UE specific BWP (i.e., determination block 652="Yes"), the processor may perform operations including receiving an indication of a search space set for multicast in block 654. When the UE-common BWP has a SCS and CP length as the UE-specific BWP and the UE-common BWP is fully contained within the UE specific BWP, the UE computing device may be configured to expect an indication of a search space set for multicast to be transmitted by the base station. The search space set for multicast may be sent to the UE computing device from the base station. In some embodiments, search space (SS) sets for unicast and multicast may be configured in the UE-specific BWP and UE-common BWP configurations separately. In some embodiments, the UE computing device may be configured to monitor the PDCCH for unicast and the PDCCH for multicast in the SS sets in both the UE-specific BWP and UE-common BWP configurations at the same time. Monitoring both the PDCCH for unicast and the PDCCH for multicast in the SS sets may reduce a likelihood of PDCCH blocking.

In response to determining that the UE-common BWP has a different SCS or CP length as the UE-specific BWP or the UE-common BWP is not fully contained within the UE specific BWP (i.e., determination block 652="No"), the processor may perform operations including receiving an indication of a time switching pattern from the base station. When the UE-common BWP has a different SCS or CP length as the UE-specific BWP or the UE-common BWP is not fully contained within the UE specific BWP, the UE computing device may be configured to expect an indication of a time switching pattern to be transmitted by the base station. The time switching pattern may be unique to the UE computing device. Should the UE not be capable of activating more than one BWP at a time, the UE-specific BWP and the UE-common BWP may be time-switched. For DCI-indicated BWP switching, a BWP indicator field in the DCI may be used to indicate which BWP, the UE-specific BWP or the UE-common BWP, to use. For example, when a DCI in UE-specific BWP indicates BWP-switching to a UE-common BWP, the DCI may indicate BWP switching and the DCI may schedule multicast data in the UE-common BWP. For example, when a DCI in UE-common BWP indicates BWP-switching to a UE-specific BWP, the DCI indicates BWP switching to a particular BWP, but does not schedule data in the UE-specific BWP, where the particular BWP is RRC configured. In some embodiments, the indication of the time switching pattern may be received in radio RRC message. In some embodiments, the indication of the time switching pattern may be received in DCI.

Figure 7:
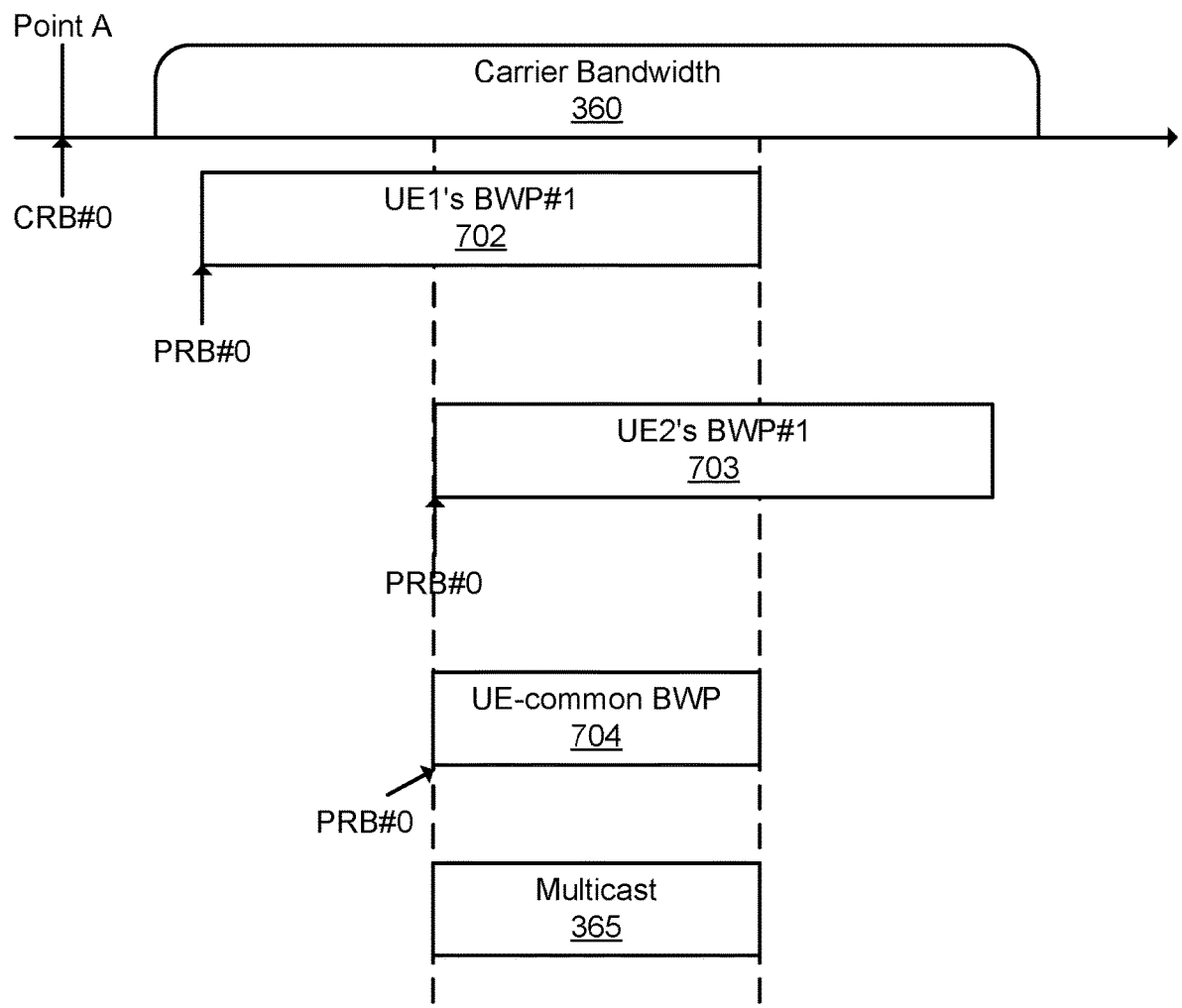
FIG. 7 is a diagram illustrating UE-common BWP allocations in a carrier bandwidth in accordance with various embodiments.

FIG. 7 is a diagram illustrating a multicast BWP that is a UE-common BWP 704 allocation in a carrier bandwidth 360 in accordance with various embodiments. With reference to FIGS. 1-7, the UE-common BWP 704 is overlapped by the UE1's specific BWP #1 702 and UE2's specific BWP #1 703. The UE-common BWP 704 may have the same SCS and CP length of an active UE-specific BWP for the UEs (e.g., BWP and the UE-common BWP may be fully contained within the UE-specific BWPs 702, 703). In such cases, the UE may monitor the PDCCH search space sets for unicast (C-RNTI) and for multicast (G-RNTI) at the same time and the network (e.g., the base station) can schedule either unicast or multicast (or both) simultaneously at the same time to provide the multicast services 365.

Figure 8:
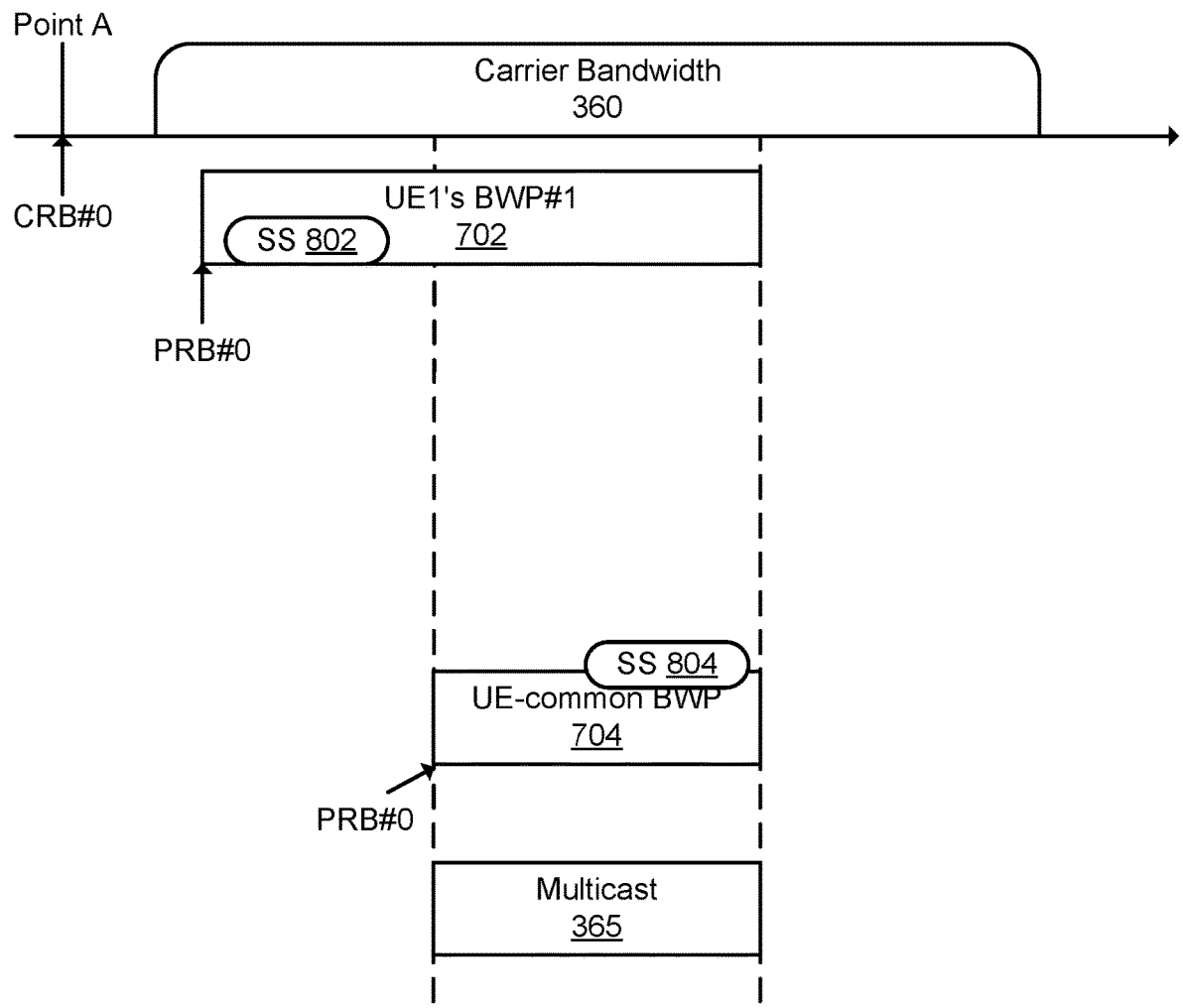
FIG. 8 is a diagram illustrating UE-common BWP allocations in a carrier bandwidth in accordance with various embodiments.

FIG. 8 is a diagram illustrating a multicast BWP that is a UE-common BWP 704 allocation in the carrier bandwidth 360 in accordance with various embodiments. With reference to FIGS. 1-8, the UE-common BWP 704 may have the same SCS and CP length of the active UE-specific BWP 702 of UE1 and the UE-common BWP 704 may be fully contained within the UE-specific BWP 702. FIG. 8 illustrates the SS sets 802 and 804 in UE1's specific BWP #1 702 and the UE-common BWP 704. In some embodiments, SS set 802 for unicast and SS set 804 for multicast may be configured in the UE-specific BWP 702 and UE-common BWP 704 configurations separately. As such SS set 802 may be dedicated to unicast and SS set 804 may be dedicated to multicast. In some embodiments, the UE may be configured to monitor the PDCCH for unicast and the PDCCH for multicast in the SS sets 802 and 804 in both the UE-specific BWP 702 and UE-common BWP 704 configurations at the same time. As such each SS set 802, 804 may be used for monitoring both the PDCCH for unicast and the PDCCH for multicast.

Figure 9A:
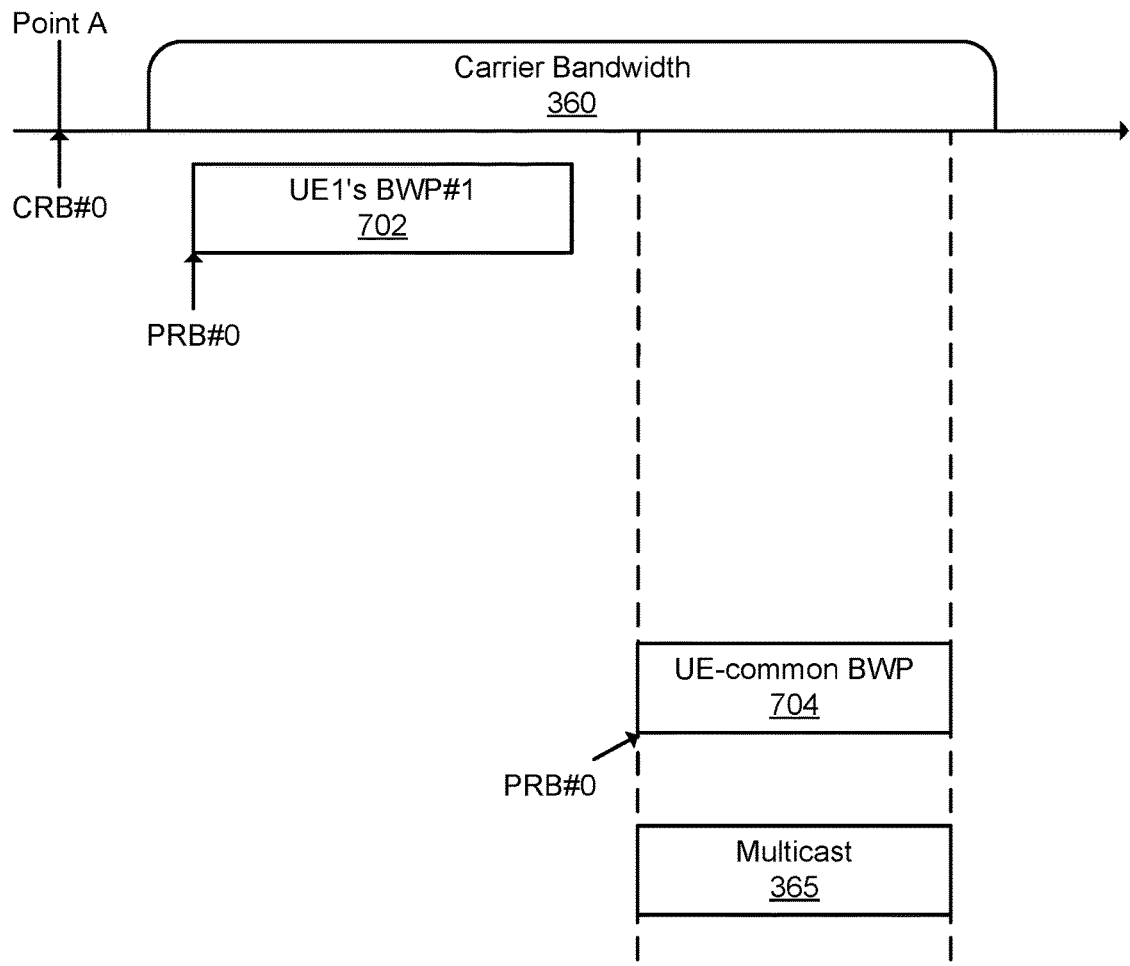
FIG. 9A is a diagram illustrating UE-common BWP allocations in a carrier bandwidth in accordance with various embodiments.
Figure 9B:
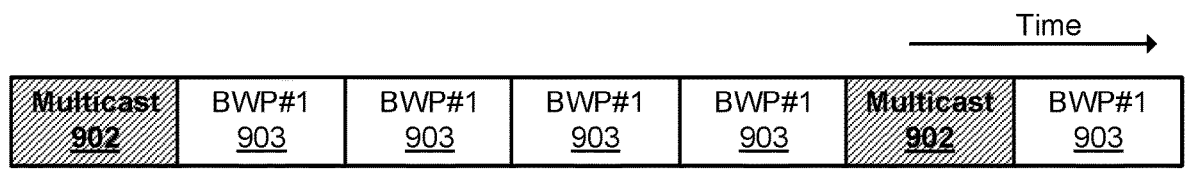
FIG. 9B is a diagram illustrating a time switching pattern in accordance with various embodiments.

FIG. 9A is a diagram illustrating a multicast BWP that is a UE-common BWP 704 allocation in the carrier bandwidth 360 in accordance with various embodiments. With reference to FIGS. 1-9A, the UE-common BWP 704 may have a different SCS and CP length of the active UE-specific BWP 702 of UE1 and the UE-common BWP 704 may not be fully contained within the UE-specific BWP 702. In such an example as illustrated in FIG. 9A, should the UE1 not be capable of activating more than one BWP at a time, the UE-specific BWP 702 and the UE-common BWP 704 may be time-switched. FIG. 9B is a diagram illustrating a time switching pattern in accordance with various embodiments. With reference to FIGS. 1-9B, the time switching pattern may indicate UE-common BWP active periods 902 and UE-specific BWP active periods 903. In some embodiments, the indication of the time switching pattern may be sent in RRC message. In some embodiments, the indication of the time switching pattern may be sent in DCI.

Figure 10A:
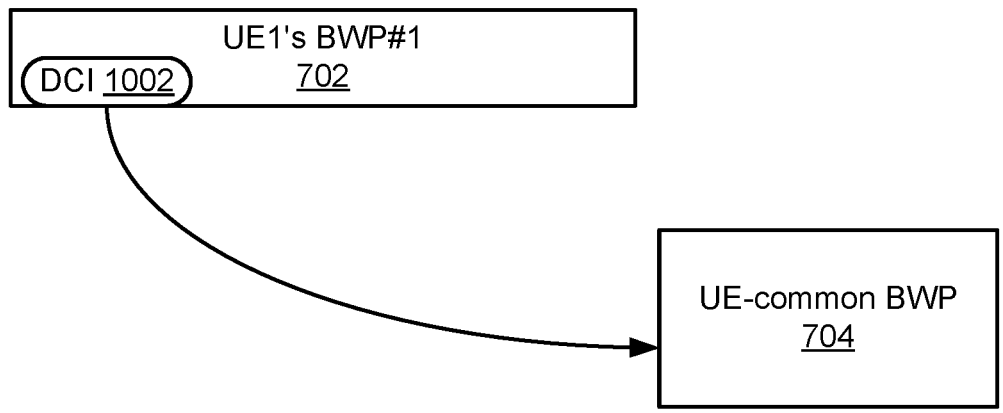
FIG. 10A is a diagram illustrating a DCI for BWP switching in accordance with various embodiments.
Figure 10B:
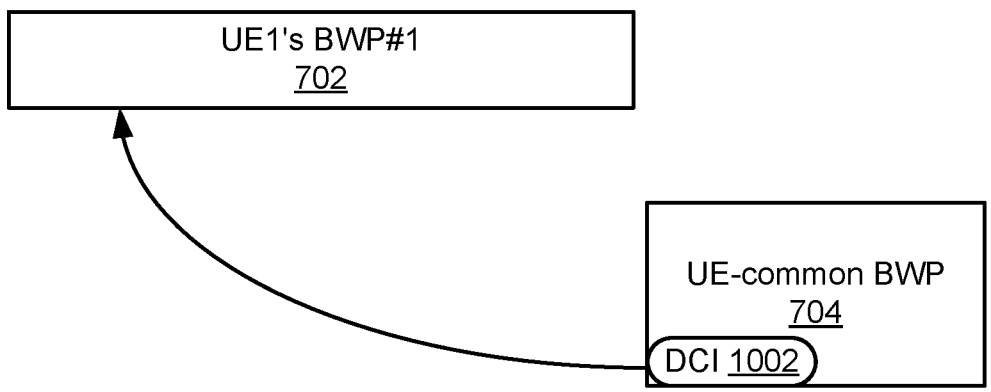
FIG. 10B is a diagram illustrating a DCI for BWP switching in accordance with various embodiments.

FIGS. 10A and 10B are diagrams illustrating DCIs for BWP switching in accordance with various embodiments. With reference to FIGS. 1-10B, for DCI-indicated BWP switching, a BWP indicator field in the DCI 1002 may be used to indicate which BWP, the UE-specific BWP 702 or the UE-common BWP 704, to use. For example, when a DCI 1002 in UE-specific BWP 702 indicates BWP-switching to a UE-common BWP 704, the DCI 1002 may indicate BWP switching and the DCI 1002 may schedule multicast data in the UE-common BWP 704. For example, when a DCI 1002 in UE-common BWP 704 indicates BWP-switching to a UE-specific BWP 702, the DCI 1002 indicates BWP switching to a particular BWP (e.g., UE specific BWP 702), but does not schedule data in the UE-specific BWP 702, where the particular BWP is RRC configured.

Figure 11:
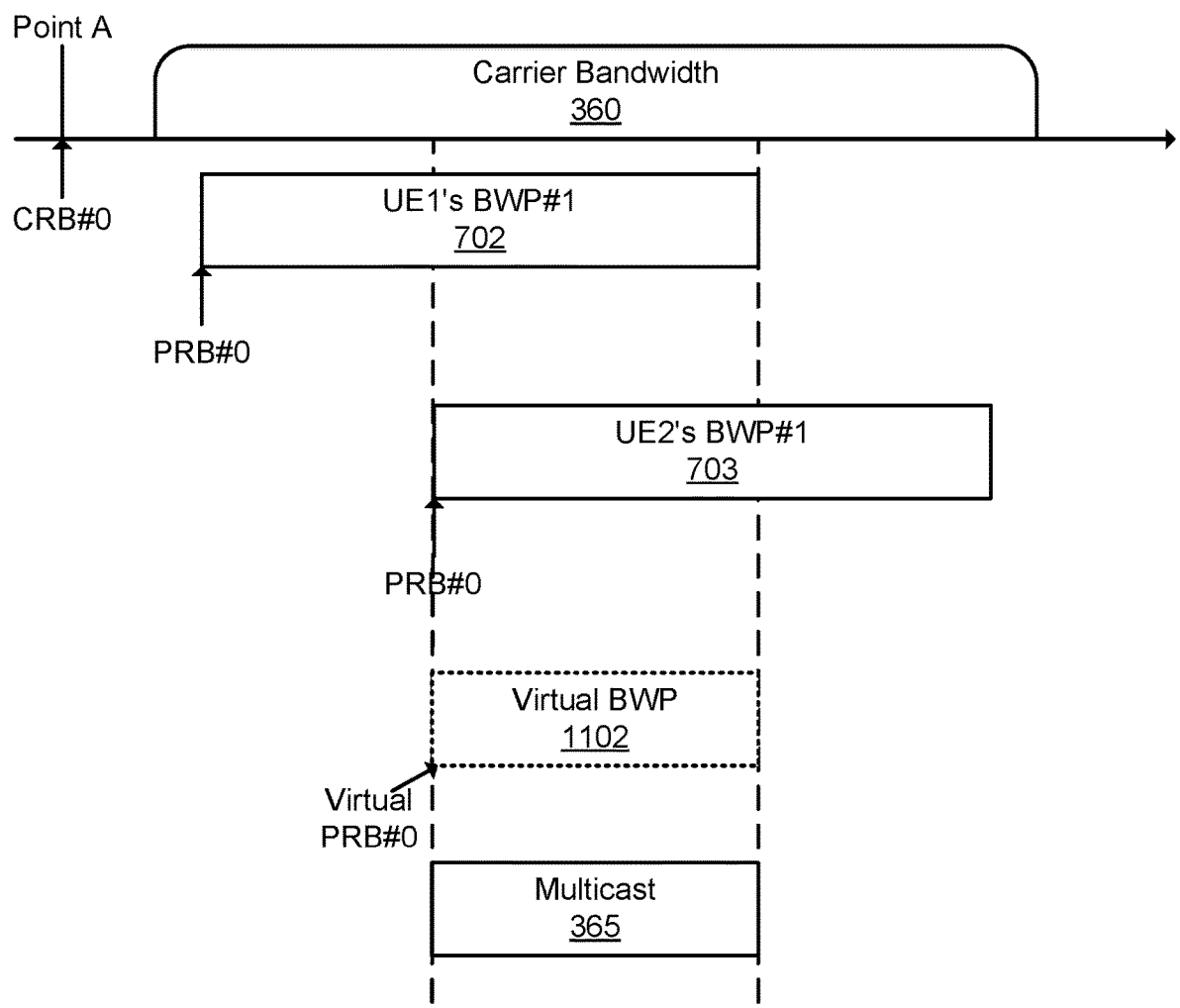
FIG. 11 is a diagram illustrating virtual BWP allocations in a carrier bandwidth in accordance with various embodiments.
Figure 12:
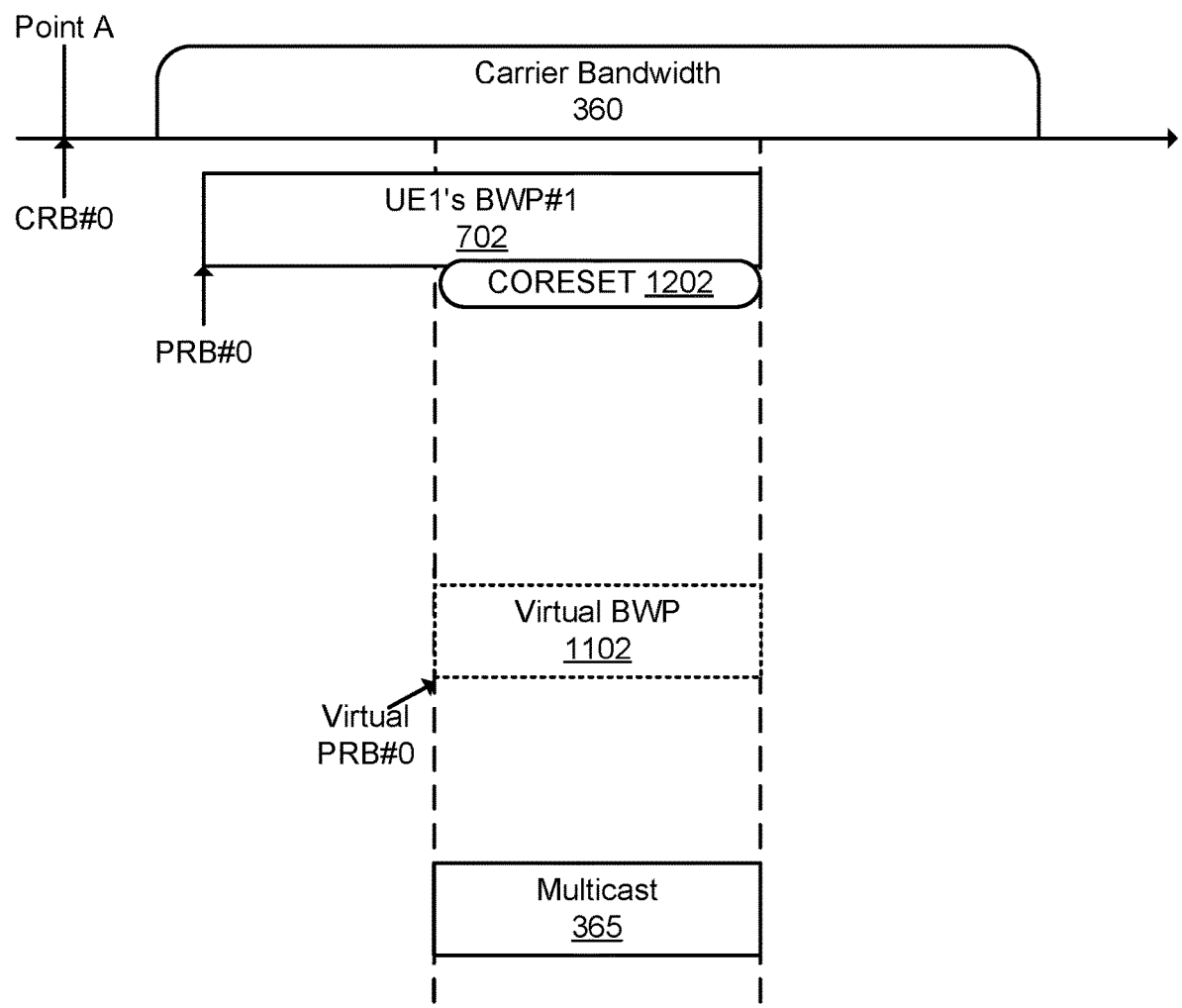
FIG. 12 is a diagram illustrating virtual BWP allocations in a carrier bandwidth in accordance with various embodiments.

FIG. 11 is a diagram illustrating a multicast BWP that is a virtual BWP allocation 1102 in a carrier bandwidth 360 in accordance with various embodiments. With reference to FIGS. 1-11, the virtual BWP allocation 1102 may not be a defined actual BWP, but rather the virtual BWP 1102 may be a subset of parameters of a BWP. The virtual BWP 1102 may be configured by the base station to be fully contained in UE1's specific BWP #1 702 and UE2's specific BWP #1 703 with the same SCS and CP length. In various embodiments, the network (e.g., the base station) may configure the virtual BWP 1102 such that the UEs receiving the same multicast service 365 may have active BWPs 702, 703 that fully contain the virtual BWP 1102. In some embodiments, the virtual BWP 1102 may be identified to a UE by a configuration element, such as a starting RB and RB length element FIG. 12 is a diagram illustrating a multicast BWP that is a virtual BWP allocation 1102 in a carrier bandwidth 360 in accordance with various embodiments. With reference to FIGS. 1-12, the virtual BWP 1102 may be identified to a UE by a CORESET 1202 bandwidth configuration. As an example, the UE may be configured with a special CORESET 1202 for multicast. The virtual BWP 1102 bandwidth may be determined by the lowest and the highest RB indexes of the CORESET 1202 for multicast. In some embodiments, should the UE be configured with multiple special CORESETs for multicast, the virtual BWP 1102 bandwidth may be determined to be at the union of the multiple CORESETs (e.g., the lowest RB index among the CORESETs to the highest RB index among the CORESETs).

Figure 13:
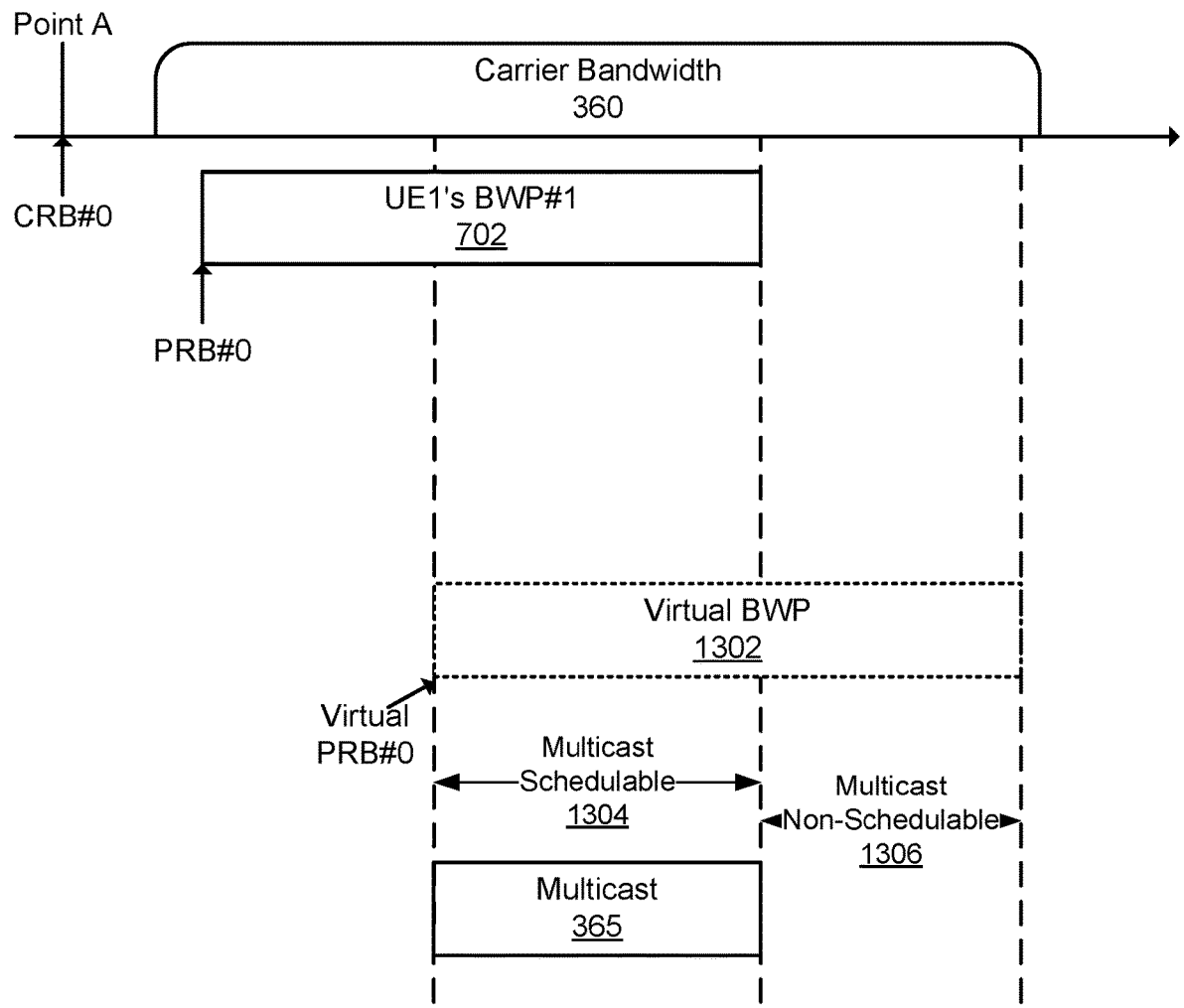
FIG. 13 is a diagram illustrating virtual BWP allocations in a carrier bandwidth in accordance with various embodiments.

FIG. 13 is a diagram illustrating a multicast BWP that is a virtual BWP allocation 1302 in a carrier bandwidth 360 in accordance with various embodiments. With reference to FIGS. 1-13, the virtual BWP 1302 may be transparent to the UE. For example, a UE may be configured with an offset value or virtual PRB #0, but may not be configured with a specific bandwidth for the virtual BWP 1302. For multicast data resource allocation, the UE may determine the configured RB index associated with the offset value or the virtual PRB #0 as the lowest RB index, and may be configured so as to expect the scheduled multicast data to not exceed the active BWP bandwidth (e.g., the UE expects that the network (e.g., the base station) will not transmit multicast data outside the UE-specific BWP 702). As such, the virtual BWP 1302 may include a multicast schedulable portion 1304 and a multicast non-schedulable portion 1306. In such an example, DCI field sizes may be the same for unicast and multicast. In such an example virtual BWP 1302 configuration, when a UE detects a DL DCI, depending on whether the DL DCI schedules unicast data or multicast data, the UE interprets the DCI frequency-domain resource allocation field such that PRB #0 or virtual PRB #0 is the lowest RB index of the resource allocation. Whether the DL DCI schedules unicast data or multicast data may be identified by RNTI scrambling of the CRC of the DCI (e.g., G-RNTI or C-RNTI/MCS-C-RNTI/CS-RNTI), the DL DCI payload size, and/or the DL DCI format.

Figure 14:
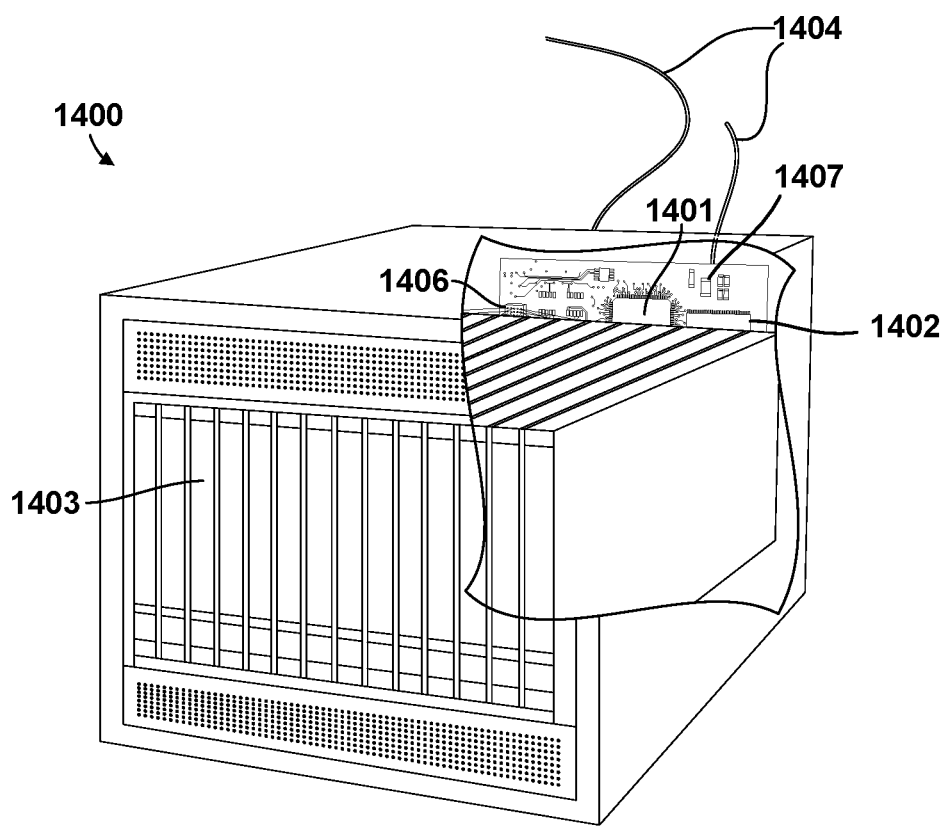
FIG. 14 of a network computing device suitable for supporting radio resource allocation in accordance with various embodiments.

Various embodiments may be implemented on a variety of wireless network devices, an example of which is illustrated in FIG. 14 in the form of a wireless network computing device 1400 functioning as a network element of a communication network, such as a base station (e.g., the base station 110, 350). Such network computing devices may include at least the components illustrated in FIG. 14. With reference to FIGS. 1-14, the network computing device 1400 may typically include a processor 1401 coupled to volatile memory 1402 and a large capacity nonvolatile memory, such as a disk drive 1403. The network computing device 1400 may also include a peripheral memory access device such as a floppy disc drive, compact disc (CD) or digital video disc (DVD) drive 1406 coupled to the processor 1401. The network computing device 1400 may also include network access ports 1404 (or interfaces) coupled to the processor 1401 for establishing data connections with a network, such as the Internet and/or a local area network coupled to other system computers and servers. The network computing device 1400 may include one or more antennas 1407 for sending and receiving electromagnetic radiation that may be connected to a wireless communication link. The network computing device 1400 may include additional access ports, such as USB, Firewire, Thunderbolt, and the like for coupling to peripherals, external memory, or other devices.

Figure 15:
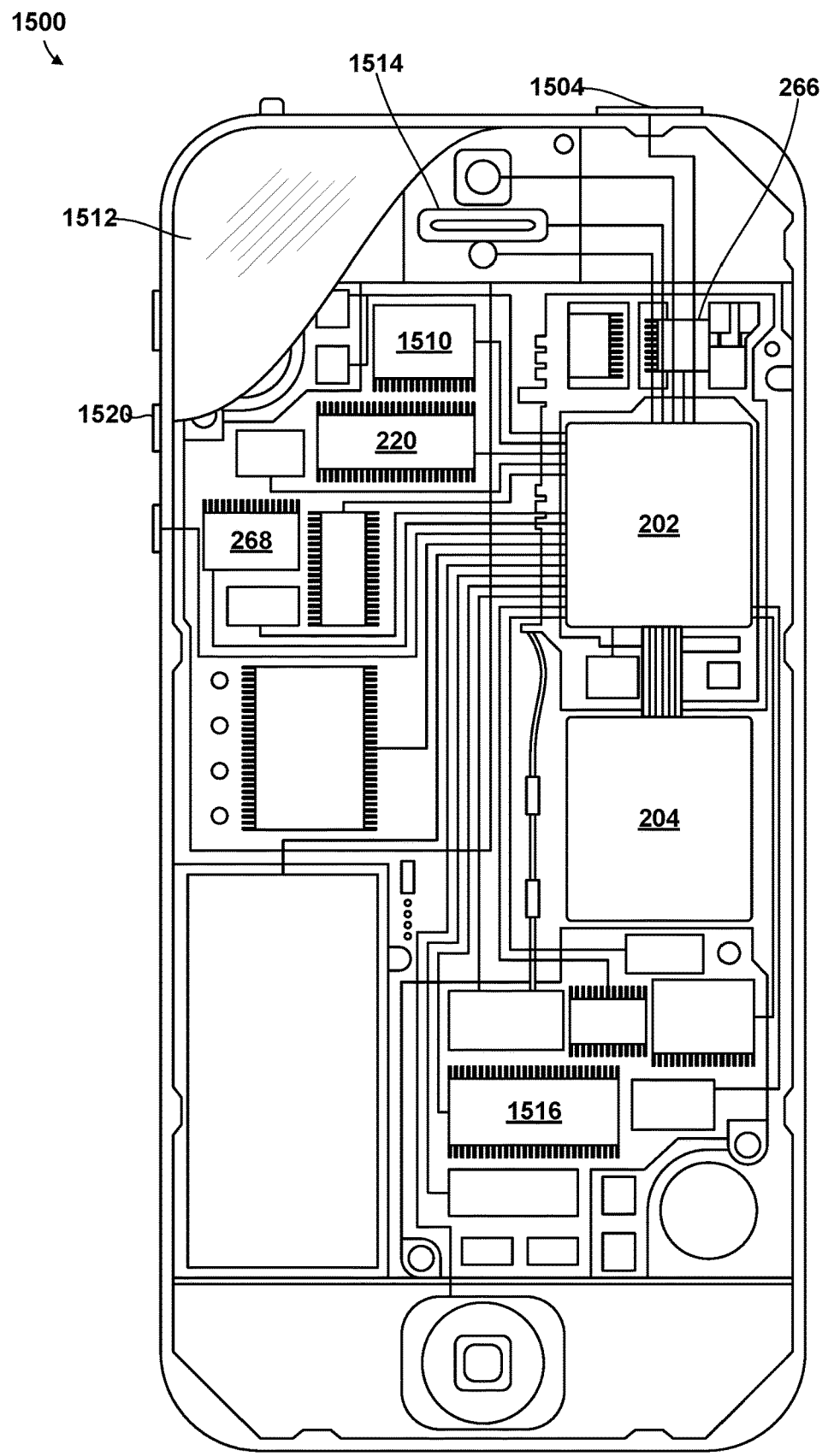
FIG. 15 is a component block diagram of a wireless communication device suitable for supporting radio resource allocation in accordance with various embodiments.

Various embodiments may be implemented on a variety of wireless devices (e.g., the wireless device 120a-120e, 200, 320), an example of which is illustrated in FIG. 15 in the form of a smartphone 1500. With reference to FIGS. 1-15, the smartphone 1500 may include a first SOC 202 (e.g., a SOC-CPU) coupled to a second SOC 204 (e.g., a 5G capable SOC). The first and second SOCs 202, 204 may be coupled to internal memory 220, 1516, a display 1512, and to a speaker 1514. Additionally, the smartphone 1500 may include an antenna 1504 for sending and receiving electromagnetic radiation that may be connected to a wireless transceiver 266 coupled to one or more processors in the first and/or second SOCs 202, 204. Smartphones 1500 typically also include menu selection buttons or rocker switches 1520 for receiving user inputs. The first and second SOCs 202, 204 may also be coupled to at least one SIM 268 and/or a SIM interface that may store information supporting a first 5G-NR subscription and a second 5G-NR subscription, which support service on a 5G non-standalone (NSA) network.

A typical smartphone 1500 also includes a sound encoding/decoding (CODEC) circuit 1510, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 1510 may include a digital signal processor (DSP) circuit (not shown separately).

The processors of the wireless network computing device 1400 and the smart phone 1500 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Typically, software applications may be stored in the memory 220, 1516 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500, 550, 600, and 650 may be substituted for or combined with one or more operations of the methods 500, 550, 600, and 650.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A base station for supporting multicast services in a wireless network, comprising:
a processor configured with processor-executable instructions to perform operations comprising:
determining a multicast bandwidth part (BWP) within a carrier bandwidth;
sending an indication of the multicast BWP to one or more user equipments (UEs) in communication with the base station, wherein the multicast BWP is a common frequency bandwidth resource configured to be used by at least a portion of the one or more UEs in communication with the base station;
scheduling transmission of multicast data in the multicast BWP; and
for each of the one or more UEs:
determining whether the common frequency bandwidth resource BWP has a same subcarrier spacing (SCS) and cyclic prefix (CP) length as a UE-specific BWP and the common frequency bandwidth resource is fully contained within the UE-specific BWP; and
sending an indication of a search space set for multicast to the respective UE in response to determining that the common frequency bandwidth resource has a same SCS and CP length as the UE-specific BWP and the common frequency bandwidth resource is fully contained within the UE-specific BWP.

2. The base station of claim 1, wherein the search space set for multicast is a search space set for multicast or unicast.

3. The base station of claim 1, wherein the processor is configured with processor-executable instructions to further perform operations, for each of the one or more UEs, comprising:
determining a time switching pattern for the respective UE in response to determining that the common frequency bandwidth resource has a different SCS or CP length than the UE-specific BWP or that the common frequency bandwidth resource is not fully contained within the UE-specific BWP; and
sending an indication of the time switching pattern for the respective UE to the respective UE.

4. The base station of claim 3, wherein the processor is configured with processor-executable instructions to perform operations such that sending the indication of the time switching pattern comprises sending the indication of the time switching pattern in a radio resource control (RRC) message.

5. The base station of claim 3, wherein the processor is configured with processor-executable instructions to perform operations such that sending the indication of the time switching pattern comprises sending the indication of the time switching pattern in a down link control information (DCI).

6. The base station of claim 5, wherein:
a DCI in the UE-specific BWP indicates BWP switching to the common frequency bandwidth resource and schedules multicast data in the common frequency bandwidth resource; and
a DCI in the common frequency bandwidth resource indicates BWP switching to the common frequency bandwidth resource and does not schedule data in the UE-specific BWP.

7. A method supporting multicast services at a base station, comprising:
determining, at the base station, a multicast bandwidth part (BWP) within a carrier bandwidth;
sending, by the base station, an indication of the multicast BWP to one or more user equipments UEs in communication with the base station, wherein the multicast BWP is a common frequency bandwidth resource configured to be used by at least a portion of the one or more UEs in communication with the base station;
scheduling, by the base station, transmission of multicast data in the multicast BWP; and
for each of the one or more UEs:
determining, by the base station, whether the common frequency bandwidth resource has a same subcarrier spacing (SCS) and cyclic prefix (CP) length as a UE-specific BWP and the common frequency bandwidth resource is fully contained within the UE-specific BWP; and
sending, by the base station, an indication of a search space set for multicast to the respective UE in response to determining that the common frequency bandwidth resource has a same SCS and CP length as the UE-specific BWP and that the common frequency bandwidth resource is fully contained within the UE-specific BWP.

8. The method of claim 7, wherein the search space set for multicast is a search space set for multicast or unicast.

9. The method of claim 7, further comprising, for each of the one or more UEs:
determining, by the base station, a time switching pattern for the respective UE in response to determining that the common frequency bandwidth resource has a different SCS or CP length than the UE-specific BWP or that the common frequency bandwidth resource is not fully contained within the UE-specific BWP; and
sending, by the base station, an indication of the time switching pattern for the respective UE to the respective UE.

10. The method of claim 9, wherein sending the indication of the time switching pattern comprises sending the indication of the time switching pattern in a radio resource control (RRC) message.

11. The method of claim 9, wherein sending the indication of the time switching pattern comprises sending the indication of the time switching pattern in a down link control information (DCI).

12. The method of claim 11, wherein:
a DCI in the UE-specific BWP indicates BWP switching to the common frequency bandwidth resource schedules multicast data in the common frequency bandwidth resource; and
a DCI in the common frequency bandwidth resource indicates BWP switching to the UE-common BWP and does not schedule data in the UE-specific BWP.

13. A user equipment (UE), comprising:
a processor configured with processor-executable instructions to perform operations comprising:
receiving an indication of a multicast bandwidth part (BWP) within a carrier bandwidth from a base station of a wireless network;
receiving multicast data from the base station in the multicast BWP, wherein the multicast BWP is a common frequency bandwidth resource configured to be used by at least a portion of one or more UEs in communication with the base station; and
receiving an indication of a search space set for multicast from the base station when the common frequency bandwidth resource has a same subcarrier spacing (SCS) and cyclic prefix (CP) length as a UE-specific BWP and the common frequency bandwidth resource is fully contained within the UE-specific BWP.

14. The UE of claim 13, wherein the search space set for multicast is a search space set for multicast or unicast.

15. The UE of claim 13, wherein the processor is configured with processor-executable instructions to perform operations such that receiving the indication of the time switching pattern from the base station comprises receiving the indication of the time switching pattern in a radio resource control (RRC) message.

16. The UE of claim 13, wherein the processor is configured with processor-executable instructions to perform operations such that receiving the indication of the time switching pattern from the base station comprises receiving the indication of the time switching pattern in a downlink control information (DCI).

17. The UE of claim 16, wherein:
a DCI in the UE-specific BWP indicates BWP switching to the common frequency bandwidth resource and schedules multicast data in the common frequency bandwidth resource; and
a DCI in the common frequency bandwidth resource indicates BWP switching to the common frequency bandwidth resource and does not schedule data in the UE-specific BWP.

18. The UE of claim 13, wherein the processor is configured with processor-executable instructions to perform operations further comprising:
receiving an indication of a time switching pattern from the base station when the common frequency bandwidth resource has a different SCS or CP length than the UE-specific BWP or when the common frequency bandwidth resource is not fully contained within the UE-specific BWP.

19. A method for radio resource allocation performed at a user equipment (UE) for receiving multicast services from a base station, comprising:
receiving, by the UE, an indication of a multicast bandwidth part (BWP) within a carrier bandwidth from a base station;
receiving, by the the UE, multicast data from the base station in the multicast BWP, wherein the multicast BWP is a common frequency bandwidth resource configured to be used by at least a portion of one or more UEs in communication with the base station; and
receiving, by the UE, an indication of a search space set for multicast when the common frequency bandwidth resource has a same subcarrier spacing (SCS) and cyclic prefix (CP) length as a UE-specific BWP and the common frequency bandwidth resource is fully contained within the UE-specific BWP.

20. The method of claim 19, wherein receiving the indication of the time switching pattern comprises receiving the indication of the time switching pattern in a radio resource control (RRC) message.

21. The method of claim 19, wherein the search space set for multicast is a search space set for multicast or unicast.

22. The method of claim 19, wherein receiving the indication of the time switching pattern comprises receiving the indication of the time switching pattern in a downlink control information (DCI).

23. The method of claim 22, wherein:
a DCI in the UE-specific BWP indicates BWP switching to the common frequency bandwidth resource and schedules multicast data in the common frequency bandwidth resource; and
a DCI in the common frequency bandwidth resource indicates BWP switching to the common frequency bandwidth resource and does not schedule data in the UE-specific BWP.

24. The method of claim 19, further comprising:
receiving, by the UE, an indication of a time switching pattern when the common frequency bandwidth resource has a different SCS or CP length than the UE-specific BWP or when the common frequency bandwidth resource is not fully contained within the UE-specific BWP.

* * * * *